US012756757B2

(12) United States Patent
Hu et al.

(10) Patent No.: US 12,756,757 B2
(45) Date of Patent: Oct. 6, 2026

(54) FEEDBACK INDICATION METHOD AND APPARATUS

(71) Applicant: HUAWEI TECHNOLOGIES CO., LTD., Shenzhen (CN)

(72) Inventors: Mengshi Hu, Shenzhen (CN); Xiao Han, Shenzhen (CN); Rui Du, Shenzhen (CN); Jian Yu, Shenzhen (CN); Chenchen Liu, Shenzhen (CN); Yi Lv, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/541,477

(22) Filed: Dec. 15, 2023

(65) Prior Publication Data

US 2024/0121306 A1 Apr. 11, 2024

Related U.S. Application Data

(63) Continuation of application No. PCT/CN2022/098192, filed on Jun. 10, 2022.

(30) Foreign Application Priority Data

Jun. 17, 2021 (CN) ......................... 202110674951.7

(51) Int. Cl.
*H04L 67/12* (2022.01)
*H04W 76/12* (2018.01)

(52) U.S. Cl.
CPC ............. *H04L 67/12* (2013.01); *H04W 76/12* (2018.02)

(58) Field of Classification Search
CPC ............................... H04L 67/12; H04W 76/12
See application file for complete search history.

(56) References Cited

U.S. PATENT DOCUMENTS

2016/0204960 A1 7/2016 Yu
2020/0359248 A1* 11/2020 Sadeghi ............ H04W 74/0808
(Continued)

FOREIGN PATENT DOCUMENTS

CN 109547072 A 3/2019
CN 112350809 A 2/2021
(Continued)

OTHER PUBLICATIONS

Lim et al., "Sensing Measurement sequence of 11bf," Apr. 2021. (Year: 2021).*
(Continued)

*Primary Examiner* — Andrew C Georgandellis
(74) *Attorney, Agent, or Firm* — WOMBLE BOND DICKINSON (US) LLP

(57) ABSTRACT

This application provides a feedback indication method and apparatus, to more comprehensively indicate a feedback, so as to improve applicability of a sensing technology in a scenario of a plurality of devices and a plurality of interactions. The method and the apparatus may be applied to a communication system. The method includes: A first device generates a first frame, and sends the first frame. The first frame includes first information, and the first information indicates a feedback type of a first feedback and/or a feedback type of a second feedback. The first feedback and the second feedback are feedbacks at different levels.

20 Claims, 22 Drawing Sheets

(56) References Cited

U.S. PATENT DOCUMENTS

| | | | | |
|---|---|---|---|---|
| 2022/0345187 | A1* | 10/2022 | Merlin | H04B 7/0658 |
| 2025/0031079 | A1* | 1/2025 | Dong | H04W 24/02 |

FOREIGN PATENT DOCUMENTS

| | | | |
|---|---|---|---|
| CN | 112748425 | A | 5/2021 |
| WO | 2020253492 | A1 | 12/2020 |

OTHER PUBLICATIONS

Tony Xiao Han: "TGbf Motions List." IEEE 802.11-20/1874r13, Feb. 5, 2021, total 40 pages.
Rui Du (Huawei) et al., "Definitions and scenarios of the WLAN sensing",IEEE 802.11-21/0035r0, Jan. 12, 2021, XP068175714,total 20 pages.
Dongguk Lim (LGE) et al., "Sensing Measurement sequence of 11bf",IEEE 802.11-21/0419r1, Apr. 8, 2021, XP068179832,total 18 pages.
Rui Du et al, "Definitions and scenarios of the WLAN sensing-follow ups",IEEE 802.11-21/0147r3, Jan. 26, 2021, total 21 pages.

* cited by examiner

FEEDBACK INDICATION METHOD AND APPARATUS

CROSS-REFERENCE TO RELATED APPLICATIONS

This application is a continuation of International Application No. PCT/CN2022/098192, filed on Jun. 10, 2022, which claims priority to Chinese Patent Application No. 202110674951.7, filed on Jun. 17, 2021. The disclosures of the aforementioned applications are hereby incorporated by reference in their entireties.

TECHNICAL FIELD

This application relates to the communication field, and in particular, to a feedback indication method and apparatus.

BACKGROUND

Wireless passive sensing (sensing for short) is a technology that senses a status of a target object without requiring the target object to carry a signal source such as an electronic label.

For example, devices in a sensing process may include a transmitting device and a receiving device. The transmitting device and the receiving device may be two different devices. The transmitting device may send a measurement signal such as a null data packet (NDP). Correspondingly, the receiving device may receive the measurement signal interfered with by the target object, and determine a channel change, for example, channel state information (CSI), between a preset reference measurement signal and the measurement signal interfered with by the target object. In this way, the receiving device may directly feed back the channel change to the transmitting device, so that the transmitting device determines the status of the target object based on the channel change, to implement functions such as motion monitoring, gesture recognition, and breathing and sleep monitoring.

However, with development of technologies, a quantity of devices and a quantity of interactions may increase in a single sensing process. The foregoing manner in which the receiving device directly performs feedback to the transmitting device is gradually not applicable to a scenario of a plurality of devices and a plurality of interactions.

SUMMARY

Embodiments of this application provide a feedback indication method and apparatus, to more comprehensively indicate a feedback, so as to improve applicability of a sensing technology in a scenario of a plurality of devices and a plurality of interactions.

To achieve the foregoing objectives, the following technical solutions are used in this application.

According to a first aspect, a feedback indication method is provided. The method includes: A first device generates a first frame, and sends the first frame. The first frame includes first information, and the first information indicates a feedback type of a first feedback and/or a feedback type of a second feedback. The first feedback and the second feedback are feedbacks at different levels.

It can be learned from the method according to the first aspect that, in a scenario of a plurality of devices and a plurality of interactions, the first information indicates feedback types of a plurality of feedbacks at different levels, for example, the feedback type of the first feedback and/or the feedback type of the second feedback. This can more comprehensively and accurately indicate a feedback type, thereby improving applicability of a sensing technology in the scenario of a plurality of devices and a plurality of interactions.

In an embodiment, the first frame may further include mode indication information, and the mode indication information may indicate that the first information indicates any one of the following: the feedback type of the first feedback, the feedback type of the second feedback, or the feedback type of the first feedback and the feedback type of the second feedback. In this way, a receiver device such as a second device can accurately determine indication content of the first information based on the mode indication information, to avoid a false feedback caused by incorrectly determining the indication content of the first information, so as to improve stability of measurement.

In an embodiment, the feedback type of the first feedback may include at least one of the following: uncompressed channel state information CSI, compressed CSI, a null data packet NDP, a sensing measurement result, a feedback type determined by a sensing initiator, a feedback type determined by a sensing responder, a feedback type determined by a sensing transmitter, or a feedback type determined by a sensing receiver, where the sensing initiator is the first device. It can be learned that the first device can flexibly determine the feedback type of the first feedback based on an actual requirement. For example, if communication efficiency needs to be improved, the first device may determine that the feedback type of the first feedback is the compressed CSI, to reduce a data size of the first feedback, so as to improve the communication efficiency and reduce communication overheads. For another example, if a delay of a sensing measurement needs to be reduced, the first device may determine that the feedback type of the first feedback is the NDP, so that the first device determines a sensing measurement result based on the NDP, to avoid a delay caused by determining the sensing measurement result by another device, for example, the sensing responder, the sensing transmitter, or the sensing receiver, so as to improve measurement efficiency. For still another example, if computing load of the first device needs to be reduced, the first device may determine that the feedback type is the sensing measurement result, so that the first device can receive a sensing measurement result from another device, and the first device does not need to calculate the sensing measurement result by the first device, to reduce the computing load of the first device. For yet another example, if a service of another device has a requirement for the feedback type of the first feedback, the first device may determine that the feedback type of the first feedback is determined by the another device, so that the first feedback can meet a service requirement of the another device, to improve reliability and stability of the service.

In an embodiment, the feedback type of the second feedback may include at least one of the following: uncompressed CSI, compressed CSI, an NDP, a sensing measurement result, a feedback type determined by a sensing initiator, a feedback type determined by a sensing responder, a feedback type determined by a sensing transmitter, or a feedback type determined by a sensing receiver, where the sensing initiator is the first device. It can be learned that the first device can flexibly determine the feedback type of the second feedback based on an actual requirement. For example, if communication efficiency needs to be improved, the first device may determine that the feedback type of the second feedback is the compressed CSI, to reduce a data size of the second feedback, so as to improve the communication efficiency and reduce communication overheads. For another example, if a delay of a sensing measurement needs to be reduced, the first device may determine that the feedback type of the second feedback is the NDP, so that the first device determines a sensing measurement result based on the NDP, to avoid a delay caused by determining the sensing measurement result by another device, so as to improve measurement efficiency. For still another example, if computing load of the first device needs to be reduced, the first device may determine that the feedback type of the second feedback is the sensing measurement result, so that the first device can receive a sensing measurement result from another device, and the first device does not need to calculate the sensing measurement result by the first device, to reduce the computing load of the first device. For yet another example, if a service of another device has a requirement for the feedback type of the second feedback, the first device may determine that the feedback type of the second feedback is determined by the another device, so that the second feedback can meet a service requirement of the another device, to improve reliability and stability of the service.

In an embodiment, the first information may be carried in at least one of the following: signaling in a sensing setup phase or a sensing request message in a sensing measurement phase, to reuse signaling, so as to reduce communication overheads and improve communication efficiency.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the first information may include a first field and/or a second field. The first field may indicate the feedback type of the first feedback, and the second field may indicate the feedback type of the second feedback. In this way, if the first device needs only to indicate the first feedback, the first device may send only the first field but not the second field. Similarly, if the first device needs only to indicate the second feedback, the first device may send only the second field but not the first field. This can avoid sending redundant information, thereby reducing communication overheads and improving communication efficiency.

According to a second aspect, a feedback indication method is provided. The method includes: A second device receives a first frame, and parses the first frame. The first frame includes first information, and the first information indicates a feedback type of a first feedback and/or a feedback type of a second feedback. The first feedback and the second feedback are feedbacks at different levels.

In an embodiment, the first frame may further include mode indication information. The mode indication information may indicate that the first information indicates any one of the following: the feedback type of the first feedback, the feedback type of the second feedback, or the feedback type of the first feedback and the feedback type of the second feedback.

In an embodiment, the feedback type of the first feedback may include at least one of the following: uncompressed CSI, compressed CSI, an NDP, a sensing measurement result, a feedback type determined by a sensing initiator, a feedback type determined by a sensing responder, a feedback type determined by a sensing transmitter, or a feedback type determined by a sensing receiver, where the sensing transmitter may be the second device.

In an embodiment, the feedback type of the second feedback may include at least one of the following: uncompressed CSI, compressed CSI, an NDP, a sensing measurement result, a feedback type determined by a sensing initiator, a feedback type determined by a sensing responder, a feedback type determined by a sensing transmitter, or a feedback type determined by a sensing receiver, where the sensing transmitter may be the second device.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the first information does not indicate the feedback type of the first feedback or indicates that the feedback type of the first feedback may include a feedback type determined by a sensing transmitter, where the sensing transmitter may be the second device. In this way, after the second device parses the first frame, the method according to the second aspect may further include: The second device sends second information to a third device. The second information indicates that the feedback type of the first feedback includes at least one of the following: uncompressed CSI, compressed CSI, an NDP, a sensing measurement result, or a feedback type determined by a sensing receiver, where the sensing receiver may be the third device. It can be learned that if the first information does not indicate that the feedback type of the first feedback is at least one of the following: the uncompressed CSI, the compressed CSI, NDP, or the sensing measurement result, that is, does not indicate content of the first feedback, the second information may indicate the content of the first feedback in a supplemental manner, to ensure that the third device can normally send the first feedback, so as to ensure stability of measurement.

In an embodiment, the second information may be carried in at least one of the following: signaling in a sensing measurement phase or signaling in a sensing reporting phase, to reuse signaling, so as to reduce communication overheads and improve communication efficiency.

In an embodiment, the first information may include a first field and a second field. The first field may indicate the feedback type of the first feedback, and the second field may indicate the feedback type of the second feedback.

In an embodiment, the first field may indicate that the feedback type of the first feedback includes at least one of the following: uncompressed CSI, compressed CSI, an NDP, a sensing measurement result, or a feedback type determined by a sensing receiver, where the sensing receiver may be a third device. After the second device parses the first frame, the method according to the second aspect may further include: The second device sends only the first field to the third device.

In an embodiment, the second field may indicate that the feedback type of the second feedback includes a feedback type determined by a sensing receiver, where the sensing receiver may be a third device. After the second device parses the first frame, the method according to the second aspect may further include: The second device sends only the second field to the third device.

It can be learned that if the second device needs only to indicate the first feedback, the second device may send only the first field but not the second field. Similarly, if the second device needs only to indicate the second feedback, the second device may send only the second field but not the first field. This can avoid sending redundant information, thereby reducing communication overheads and improving communication efficiency.

Further, after the second device sends only the second field to the third device, the method according to the second aspect may further include: The second device receives third information from the third device. The third information may indicate that the feedback type of the second feedback includes at least one of the following: uncompressed CSI, compressed CSI, an NDP, or a sensing measurement result. It can be learned that if the second device does not determine that the feedback type of the second feedback is at least one of the following: the uncompressed CSI, the compressed CSI, the NDP, or the sensing measurement result, that is, does not determine content of the second feedback, the third device may determine the content of the first feedback in a supplemental manner, to ensure that the second device can normally send the second feedback, so as to ensure stability of measurement.

In an embodiment, the first information may be carried in at least one of the following: signaling in a sensing setup phase or the signaling in the sensing measurement phase, to reuse signaling, so as to reduce communication overheads and improve communication efficiency.

In addition, for technical effects of the feedback indication method according to the second aspect, refer to the technical effects of the feedback indication method according to the first aspect. Details are not described herein again.

According to a third aspect, a feedback indication method is provided. The method includes: A first device sends fourth information, to receive a first feedback and/or a second feedback. The fourth information indicates that the first device needs to obtain the first feedback and/or the second feedback, and the first feedback and the second feedback are feedbacks at different levels.

It can be learned from the method according to the third aspect that the first device may send the fourth information to a second device based on an actual requirement, for example, a service requirement. In this way, the second device may send an actually required feedback to the first device based on the fourth information, but does not send an actually unrequired feedback, to avoid sending redundant information, so as to reduce communication overheads and improve communication efficiency.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the fourth information may be carried in at least one of the following: signaling in a sensing setup phase or a sensing request message in a sensing measurement phase, to reuse signaling, so as to reduce communication overheads and improve communication efficiency.

According to a fourth aspect, a feedback indication method is provided. The method includes: A second device receives fourth information, to send a first feedback and/or a second feedback based on the fourth information. The fourth information indicates that a first device needs to obtain the first feedback and/or the second feedback, and the first feedback and the second feedback are feedbacks at different levels.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the fourth information may be carried in at least one of the following: signaling in a sensing setup phase or a sensing request message in a sensing measurement phase.

In addition, for technical effects of the feedback indication method according to the fourth aspect, refer to the technical effects of the feedback indication method according to the third aspect. Details are not described herein again.

According to a fifth aspect, a feedback indication method is provided. The method includes: A first device generates fifth information, and sends the fifth information. The fifth information indicates a second device to determine all configuration parameters of an NDPA, or the fifth information indicates a part of the configuration parameters of the NDPA, and the other part of the configuration parameters of the NDPA are determined by the second device.

It can be learned from the method according to the fifth aspect that the configuration parameter of the NDPA may be determined through cooperation between the first device and the second device. In this way, the configuration parameter of the NDPA can be flexibly determined based on a service requirement, so that the configuration parameter of the NDPA can meet the service requirement. For example, if a service of the first device requires the configuration parameter of the NDPA, the first device determines the configuration parameter of the NDPA. However, if a service of the second device requires the configuration parameter of the NDPA, the first device indicates the second device to determine at least a part of the configuration parameters of the NDPA, to meet a service requirement of the second device.

In an embodiment, the fifth information may be carried in one or more of the following: signaling in a sensing setup phase or a sensing request message in a sensing measurement phase, to reuse signaling, so as to reduce communication overheads and improve communication efficiency.

According to a sixth aspect, a feedback indication method is provided. The method includes: A second device receives fifth information, and parses the fifth information. The fifth information indicates the second device to determine all configuration parameters of an NDPA, or the fifth information indicates a part of the configuration parameters of the NDPA, and the other part of the configuration parameters of the NDPA are determined by the second device.

In an embodiment, the fifth information may be carried in one or more of the following: signaling in a sensing setup phase or a sensing request message in a sensing measurement phase.

In addition, for technical effects of the feedback indication method according to the sixth aspect, refer to the technical effects of the feedback indication method according to the fifth aspect. Details are not described herein again.

According to a seventh aspect, a feedback indication apparatus is provided. The feedback indication apparatus includes a module, a unit, or a means configured to perform the method according to the first aspect, the third aspect, or the fifth aspect. The module, the unit, or the means may be implemented by hardware, software, or hardware executing corresponding software. The hardware or software includes one or more modules or units corresponding to the foregoing functions. The feedback indication apparatus may be the first device according to the first aspect, the third aspect, or the fifth aspect, an apparatus including the first device, or an apparatus included in the first device, for example, a chip.

According to an eighth aspect, a feedback indication apparatus is provided. The feedback indication apparatus includes a module, a unit, or a means configured to perform the method according to the second aspect, the fourth aspect, or the sixth aspect. The module, the unit, or the means may be implemented by hardware, software, or hardware executing corresponding software. The hardware or software includes one or more modules or units corresponding to the foregoing functions. The feedback indication apparatus may be the second device according to the second aspect, the fourth aspect, or the sixth aspect, or an apparatus including the second device, or an apparatus included in the second device, for example, a chip.

According to a ninth aspect, a feedback indication apparatus is provided, including a processor and a memory. The memory is configured to store computer instructions. When the processor executes the instructions, the feedback indication apparatus is enabled to perform the method according to any one of the foregoing aspects. The feedback indication apparatus may be the first device according to the first aspect, the third aspect, or the fifth aspect, an apparatus including the first device, or an apparatus included in the first device. Alternatively, the feedback indication apparatus may be the second device according to the second aspect, the fourth aspect, or the sixth aspect, or an apparatus including the second device, or an apparatus included in the second device.

According to a tenth aspect, a communication system is provided. The communication system includes the first device according to the foregoing aspects and the second device according to the foregoing aspects.

According to an eleventh aspect, a computer-readable storage medium is provided, configured to store a computer program. The computer program includes instructions used to perform the method according to any one of the first aspect to the sixth aspect.

According to a twelfth aspect, a computer program is provided. The computer program includes instructions used to perform the method according to any one of the first aspect to the sixth aspect.

DESCRIPTION OF EMBODIMENTS

The following describes technical terms in embodiments of this application.

1. Sensing Process

Figure 1:
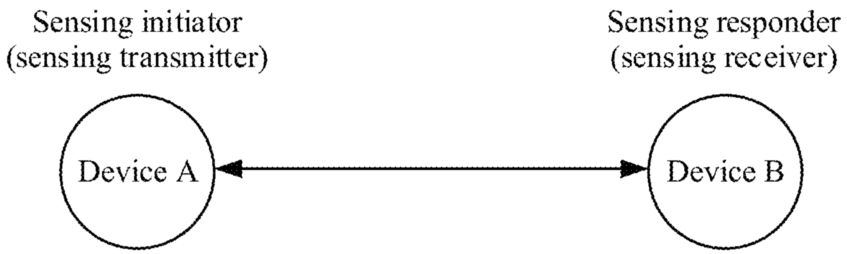
FIG. 1 is a schematic diagram 1 of an architecture of a sensing process.

A sensing process, or referred to as a sensing session, may include a plurality of roles such as a sensing initiator, a sensing responder, a sensing transmitter, and a sensing receiver. For one sensing process, the sensing initiator is configured to initiate the sensing process, the sensing responder is configured to participate in the sensing process initiated by the sensing initiator, the sensing transmitter is configured to initiate a sensing measurement in the sensing process, for example, transmit an NDP, and the sensing receiver is configured to determine a sensing measurement result in response to the sensing measurement such as CSI, and feed back the sensing measurement result to the sensing initiator. It can be learned that functions of the foregoing plurality of roles do not conflict with each other. In other words, for a device in the sensing process, one device may have one or more of the foregoing roles. For example, the sensing initiator, the sensing responder, the sensing transmitter, and the sensing receiver may be a same device, or may be two different devices. For example, as shown in FIG. 1, devices in the sensing process include a device A and a device B. The device A may be a sensing initiator of a sensing transmitter, and the device B may be a sensing responder of a sensing receiver. For ease of understanding, the following uses the device A and the device B as an example to describe the foregoing sensing process.

Figure 2:
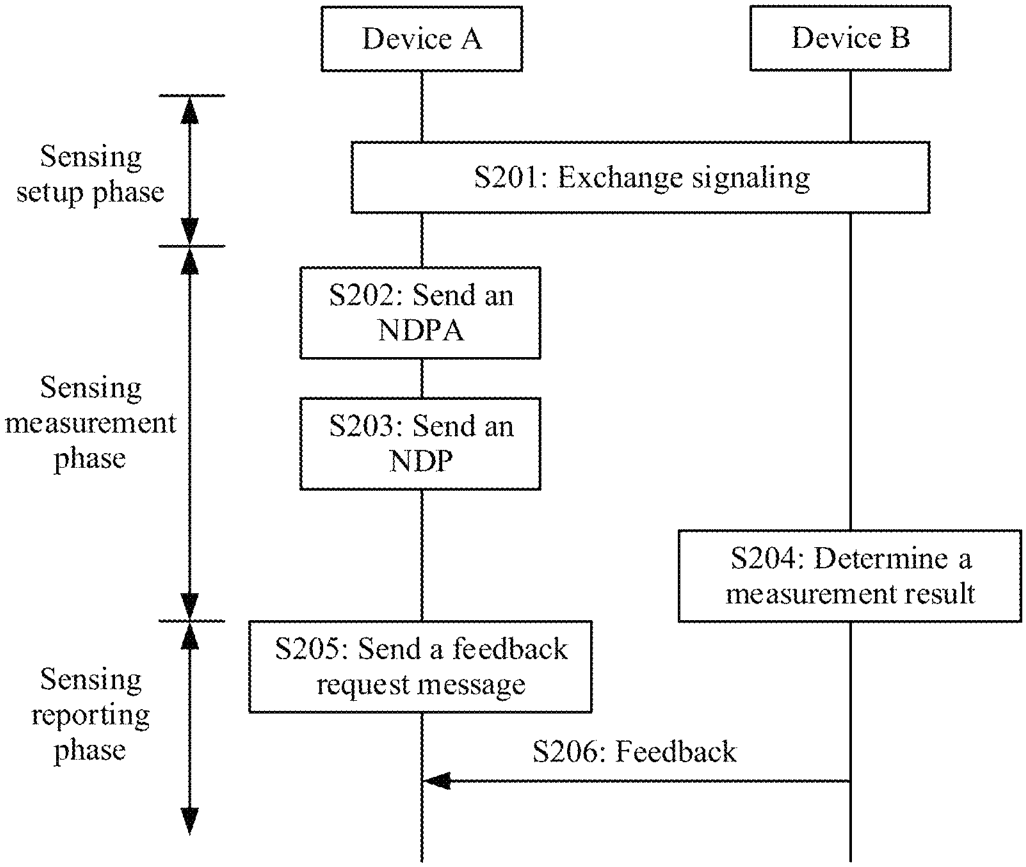
FIG. 2 is a schematic flowchart 1 of a sensing process.
Figure 3:
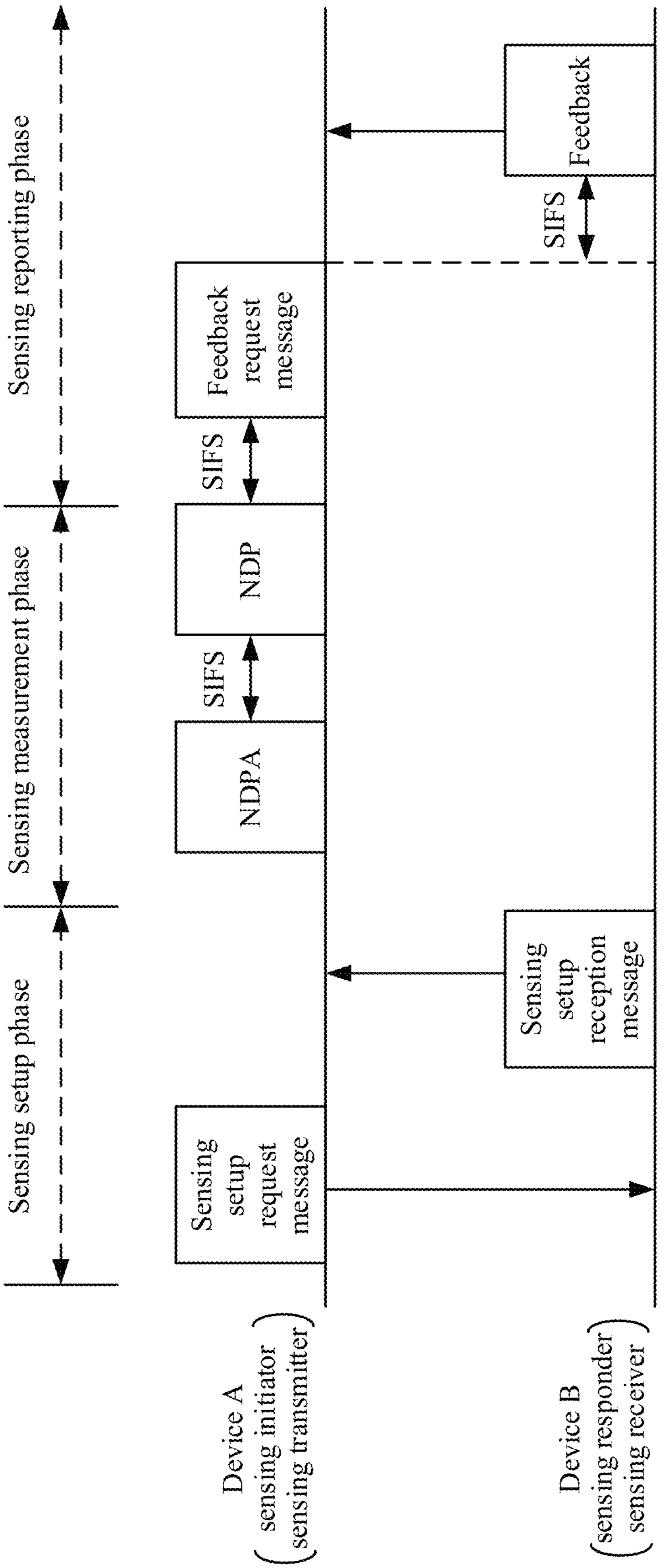
FIG. 3 is a schematic flowchart 2 of a sensing process.

For example, FIG. 2 is a schematic flowchart of the foregoing sensing process, and FIG. 3 is a schematic flowchart 2 of the foregoing sensing process.

As shown in FIG. 2, the foregoing sensing process may include the following operations.

S201: The device A and the device B exchange signaling, to set up a sensing process.

In a sensing setup phase, the device A and the device B may exchange signaling. As shown in FIG. 3, the device A sends a sensing setup request message to the device B, and the device B sends a sensing setup reception message to the device A, to notify each other of roles in a sensing process. For example, the device A is a sensing initiator and a sensing transmitter, and the device B is a sensing responder and a sensing receiver, to set up the sensing process, or a sensing session.

S202: The device A sends a null data packet announcement (NDPA).

As shown in FIG. 3, after the sensing session is set up, a sensing measurement phase may be started. In the sensing measurement phase, the device A may send an NDPA at a time point, for example, a first time point. The NDPA indicates the device A to perform sensing measurement at a second time point after the first time point, for example, on a next frame that is a short interframe space (SIFS) later than the NDPA, for example, sending a null data packet (NDP), and a configuration indicating the NDP such as a long training field (LTF), so that the device B can receive and process the NDP at the second time point.

S203: The device A sends an NDP.

S204: The device B determines a feedback 1.

The device B may determine, based on a preconfigured feedback type, a feedback that needs to be sent to the device A, for example, the feedback 1. The feedback type may be used to determine content of the feedback, and includes one or more of the following: CSI, for example, compressed CSI and uncompressed CSI, a sensing measurement result, or an NDP. In an embodiment, if the feedback type includes the CSI, the device B may determine the feedback 1, namely, the CSI, based on the NDP. If the feedback type includes the sensing measurement result, the device B may determine the feedback 1, namely, the sensing measurement result such as whether a target object is in motion, a motion type, or whether a target object is sleeping, based on the CSI, for example, currently determined CSI and historically determined CSI. If the feedback type includes the NDP, the device B may determine the feedback 1, namely, the NDP, based on a configuration of the foregoing NDP.

S205: The device A sends a feedback request (feedback trigger) message.

As shown in FIG. 3, after sending the NDP, the device A may enter a sensing reporting phase. In the sensing reporting phase, the device A may send the feedback request message at a third time point, for example, on a next frame that is one SIFS later than the NDP. The feedback request message may indicate the device B to perform feedback at a fourth time point after the third time point, for example, on a next frame that is one SIFS later than the feedback request message, for example, to send a feedback 1.

S206: The device B sends the feedback 1 to the device A.

The device B may send the feedback 1 to the device A at a fourth time point. The feedback 1 may include one or more of the CSI, the sensing measurement result, or the NDP. In this way, the device A may obtain or determine the sensing measurement result of the target object based on the feedback 1.

Figure 4:
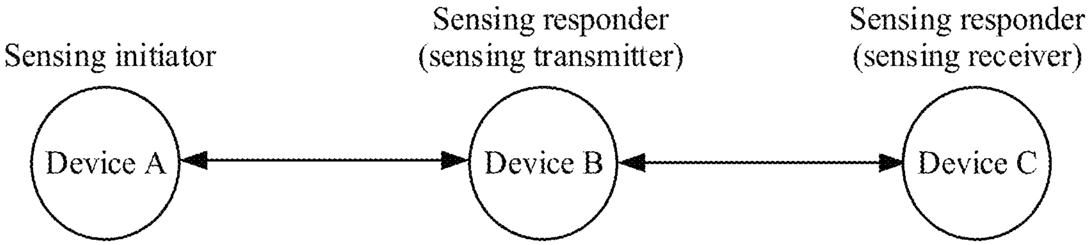
FIG. 4 is a schematic diagram 2 of an architecture of a sensing process.

In conclusion, based on the procedures shown in FIG. 2 and FIG. 3, it can be learned that, when the device A is the sensing initiator of the sensing transmitter, and device B is the sensing responder of the sensing receiver, there is only one feedback, for example, the feedback 1 sent by the device B to the device A. In addition, a feedback type of the feedback 1 may be determined. For example, the device B determines the feedback type of the feedback 1. Therefore, in other words, in a current feedback manner, only a feedback type of one feedback can be determined. However, if the sensing process needs a greater number of devices, or a greater number of interactions, there may be a plurality of feedbacks. For example, as shown in FIG. 4, if the devices in the sensing process include a device C in addition to the device A and the device B, the device A is a sensing initiator, the device B is a sensing responder of a sensing transmitter, and the device C is a sensing responder of a sensing receiver, two feedbacks are required. For example, the device B needs to send one feedback, for example, a feedback 1, to the device A, and the device C needs to send the other feedback, for example, a feedback 2, to the device B. However, if the current feedback manner is used, only a feedback type of one feedback, for example, the feedback 1, can be determined, and a feedback type of the other feedback, for example, the feedback 2, cannot be determined. In other words, the current feedback manner is no longer applicable to a multi-feedback scenario with a plurality of devices and a plurality of interactions.

The following describes the technical solutions of this application with reference to the accompanying drawings.

The technical solutions in embodiments of this application may be applied to various communication systems, for example, a wireless fidelity (Wi-Fi) system, a vehicle-to-everything (V2X) communication system, a device-to-device (D2D) communication system, an internet of vehicles communication system, 4th generation (4G) mobile communication systems such as a long term evolution (LTE) system and a worldwide interoperability for microwave access (WiMAX) communication system, 5th generation (5G) mobile communication systems such as a new radio (new radio, NR) system, and future communication systems such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design solution described as an "example" in this application should not be explained as being more preferred or having more advantages than another embodiment or design solution. Exactly, the term "example" is used to present a concept in a manner.

In embodiments of this application, terms "information", "signal", "message", "channel", and "signaling" may sometimes be interchangeably used. It should be noted that meanings expressed by the terms are consistent when differences of the terms are not emphasized. Terms "of", "corresponding (relevant)", and "corresponding" may sometimes be interchangeably used. It should be noted that meanings expressed by the terms are consistent when differences of the terms are not emphasized.

In embodiments of this application, sometimes a subscript, for example, Wi, may be written incorrectly in a non-subscript form, for example, W1. Expressed meanings are consistent when differences are not emphasized.

A network architecture and a service scenario described in embodiments of this application are intended to describe the technical solutions in embodiments of this application more clearly, and do not constitute a limitation on the technical solutions provided in embodiments of this application. One of ordinary skilled in the art may know that: With the evolution of the network architecture and the emergence of new service scenarios, the technical solutions provided in embodiments of this application are also applicable to similar technical problems.

Figure 5:
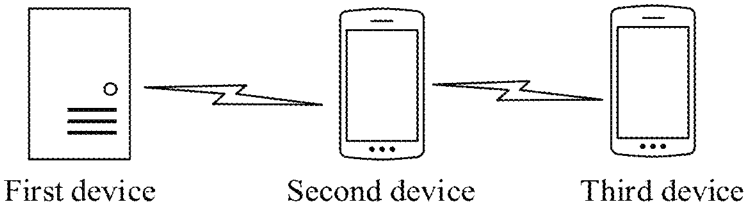
FIG. 5 is a schematic diagram of an architecture of a communication system according to an embodiment of this application.

For ease of understanding embodiments of this application, a communication system shown in FIG. 5 is first used as an example to describe in detail a communication system applicable to embodiments of this application. For example, FIG. 5 is a schematic diagram of an architecture of a communication system to which a feedback indication method is applicable according to an embodiment of this application.

As shown in FIG. 5, the communication system includes a plurality of devices such as a first device, a second device, and a third device. At least one of the plurality of devices, for example, the first device, may determine feedback types of all feedbacks or feedback types of a part of feedbacks, and remaining feedbacks, for example, a feedback type that is not determined by the at least one device, may be determined by another device, for example, a device other than the first device in the plurality of devices, for example, the second device.

In an embodiment, the first device, the second device, and the third device are used as an example, the second device may be separately connected to the first device and the third device. In an embodiment, the third device may be further connected to the first device. In addition, any one of the first device, the second device, and the third device may be a network device or a terminal device. This is not limited.

The network device is a device that is located on a network side of the communication system and has a wireless transceiver function, or a chip or a chip system that may be disposed in the device. The network device includes but is not limited to an access point (AP) in a wireless fidelity (Wi-Fi) system such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless relay node, a wireless backhaul node, a transmission point (transmission and reception point, TRP, or transmission point, TP), and the like. The network device may alternatively be a gNB or a transmission point (TRP or TP) in a 5G system, for example, a new radio (NR) system, or one antenna panel or a group of antenna panels (including a plurality of antenna panels) in a base station in a 5G system. The network device may alternatively be a network node that constitutes a gNB or a transmission point, for example, a baseband unit (BBU), a distributed unit (DU), or a road side unit (RSU) having a base station function.

The terminal device is a terminal that accesses the communication system and has a wireless transceiver function, or a chip or a chip system that may be disposed in the terminal. The terminal device may also be referred to as a user apparatus, an access terminal, a subscriber unit, a subscriber station, a mobile station, a mobile station, a remote station, a remote terminal, a mobile device, a user terminal, a terminal, a wireless communication device, a user agent, or a user apparatus. The terminal device in embodiments of this application may be a mobile phone, a tablet computer (Pad), a computer having a wireless sending and receiving function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a vehicle-mounted terminal, an RSU that has a terminal function, or the like.

It should be noted that the feedback indication method provided in embodiments of this application is applicable to two or three devices shown in FIG. 5, for example, between the first device and the second device, or between the first device and the second device and the third device. In an embodiment, refer to the following method embodiments. Details are not described herein.

It should be noted that, the solutions in embodiments of this application may also be applied to another communication system, and a corresponding name may also be replaced with a name of a corresponding function in the another communication system.

It should be understood that FIG. 5 is merely a simplified schematic diagram of an example for ease of understanding. The communication system may further include another network device and/or another terminal device that are/is not shown in FIG. 5.

The feedback indication method provided in this application may include a plurality of embodiments, for example, an embodiment 1, an embodiment 2, and an embodiment 3. The following describes in detail embodiments of the feedback indication method with reference to FIG. 6 to FIG. 24.

Embodiment 1

Figure 6:
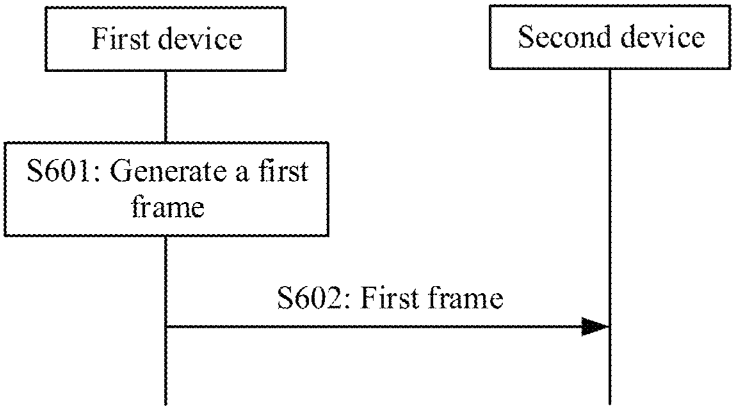
FIG. 6 is a schematic flowchart 1 of a feedback indication method according to an embodiment of this application.

For example, FIG. 6 is a schematic flowchart 1 of the feedback indication method according to an embodiment of this application. The feedback indication method is applicable to communication between the three devices shown in FIG. 5, for example, the first device, the second device, and the third device. Any of the first device, the second device, and the third device may be one or more of the following: a sensing initiator, a sensing responder, a sensing transmitter, or a sensing receiver. For ease of understanding, an example in which the sensing initiator is the first device, and the sensing transmitter and the sensing responder are the second device, the second device is the sensing responder of the sensing transmitter, and the sensing receiver and the sensing responder are the third device, or the third device is the sensing responder of the sensing receiver is used in an embodiment of the application. This is not limited.

As shown in FIG. 6, the feedback indication method may include the following operations.

S601: The first device generates a first frame.

The first frame may be frame structure data, and the frame structure data includes first information. The first information may indicate feedback types of all feedbacks or feedback types of a part of feedbacks, for example, a feedback type of a first feedback and/or a feedback type of a second feedback.

The first feedback and the second feedback may be feedbacks generated in one sensing process, and may be feedbacks at different levels. In an embodiment, in one aspect, that the first feedback and the second feedback are feedbacks at different levels may mean that a sending occasion of the first feedback is different from a sending occasion of the second feedback. For example, if the first feedback is sent before the second feedback, the first feedback may be a first-level feedback, and the second feedback may be a second-level feedback. Conversely, if the second feedback is sent before the first feedback, the second feedback may be a first-level feedback, and the first feedback may be a second-level feedback. Alternatively, in another aspect, that the first feedback and the second feedback are feedbacks at different levels may mean that a sending object of the first feedback is different from a sending object of the second feedback. For example, based on the connection relationship shown in FIG. 5, it can be learned that the first feedback may be a feedback sent by the third device to the second device, or a feedback sent by the sensing responder of the sensing receiver to the sensing responder of the sensing transmitter. Alternatively, for example, when the first device is connected to the third device, the first feedback may alternatively be a feedback sent by the third device to the first device, or a feedback sent by the sensing responder of the sensing receiver to the sensing initiator. In this way, the first feedback may be considered as the first-level feedback. The second feedback may be a feedback sent by the second device to the first device, or a feedback sent by the sensing responder of the sensing transmitter to the sensing initiator. In this way, the second feedback may be considered as the second-level feedback.

It should be understood that the foregoing levels of the feedbacks are merely an example, and is not intended as a limitation. For example, if the first device may send a plurality of feedbacks to a same device such as the second device consecutively or non-consecutively, the plurality of feedbacks may be at a same level or at different levels. The non-consecutive sending means that when the first device sends the plurality of feedbacks, the first device further receives a feedback from another device, for example, the third device. For another example, if the first device separately sends feedbacks to a plurality of devices, for example, the second device and the third device, the feedbacks may be at a same level or at different levels. In addition, the levels of the feedbacks are not limited to two levels. There may be more levels such as three levels and four levels.

It should be understood that the first feedback and the second feedback are used as an example in an embodiment of the application. This is not limited. For example, all the foregoing feedbacks may further include a third feedback, a fourth feedback, and a fifth feedback. In an embodiment, refer to the related description of the first feedback and the second feedback. Details are not described herein again.

The feedback type of the first feedback may include at least one of the following: uncompressed CSI, compressed CSI, an NDP, a sensing measurement result, a feedback type determined by the sensing initiator, a feedback type determined by the sensing responder, a feedback type determined by the sensing transmitter, or a feedback type determined by the sensing receiver. Alternatively, for example, the feedback type of the first feedback may further include a feedback type determined by any device, where the sensing measurement result may be whether a change amount or change degree of CSI exceeds a threshold. In addition, the any device may be at least one of the following: the sensing initiator, the sensing responder, the sensing transmitter, or the sensing receiver.

Therefore, it can be learned that, for the first feedback, the first device may flexibly determine the feedback type of the first feedback based on an actual requirement. For example, if communication efficiency needs to be improved, the first device may determine that the feedback type of the first feedback is the compressed CSI, to reduce a data size of the first feedback, so as to improve the communication efficiency and reduce communication overheads. For another example, if a delay of a sensing measurement needs to be reduced, the first device may determine that the feedback type of the first feedback is the NDP, so that the first device determines a sensing measurement result based on the NDP, to avoid a delay caused by determining the sensing measurement result by another device, for example, the sensing responder, the sensing transmitter, or the sensing receiver, so as to improve measurement efficiency. For still another example, if computing load of the first device needs to be reduced, the first device may determine that the feedback type is the sensing measurement result, so that the first device can receive a sensing measurement result from another device, and the first device does not need to calculate the sensing measurement result by the first device, to reduce the computing load of the first device. For yet another example, if a service of another device has a requirement for the feedback type of the first feedback, the first device may determine that the feedback type of the first feedback is determined by the another device, so that the first feedback can meet a service requirement of the another device, to improve reliability and stability of the service.

The feedback type of the second feedback may include at least one of the following: uncompressed CSI, compressed CSI, an NDP, a sensing measurement result, a feedback type determined by the sensing initiator, a feedback type determined by the sensing responder, a feedback type determined by the sensing transmitter, or a feedback type determined by the sensing receiver. Alternatively, for example, the feedback type of the second feedback may further include a feedback type determined by any device, where the any device may also be at least one of the following: the sensing initiator, the sensing responder, the sensing transmitter, or the sensing receiver.

Therefore, it can be learned that, for the second feedback, the first device may also flexibly determine the feedback type of the second feedback based on an actual requirement. For example, if communication efficiency needs to be improved, the first device may determine that the feedback type of the second feedback is the compressed CSI, to reduce a data size of the second feedback, so as to improve the communication efficiency and reduce communication overheads. For another example, if a delay of a sensing measurement needs to be reduced, the first device may determine that the feedback type of the second feedback is the NDP, so that the first device determines a sensing measurement result based on the NDP, to avoid a delay caused by determining the sensing measurement result by another device, so as to improve measurement efficiency. For still another example, if computing load of the first device needs to be reduced, the first device may determine that the feedback type of the second feedback is the sensing measurement result, so that the first device can receive a sensing measurement result from another device, and the first device does not need to calculate the sensing measurement result by the first device, to reduce the computing load of the first device. For yet another example, if a service of another device has a requirement for the feedback type of the second feedback, the first device may determine that the feedback type of the second feedback is determined by the another device, so that the second feedback can meet a service requirement of the another device, to improve reliability and stability of the service.

Further, with reference to the various feedback types of the first feedback and the various feedback types of the second feedback, the foregoing indication manner of the first information may be any one of the following manners.

Manner 1: The first information indicates only that the feedback type of the first feedback includes at least one of the following: the uncompressed CSI, the compressed CSI, the NDP, or the sensing measurement result ("a feedback type of the first feedback" for short), indicates only that the feedback type of the second feedback includes at least one of the following: the uncompressed CSI, the compressed CSI, the NDP, or the sensing measurement result ("a feedback type of the second feedback" for short), or indicates a feedback type of the first feedback and a feedback type of the second device.

Manner 2: The first information indicates only that the feedback type of the first feedback is the feedback type determined by the sensing transmitter, that is, the feedback type of the first feedback is determined by the second device, indicates only that the feedback type of the second feedback is the feedback type determined by the sensing transmitter, that is, the feedback type of the second feedback is determined by the second device, or indicates that both the feedback type of the first feedback and the feedback type of the second feedback are determined by the second device.

Manner 3: The first information indicates only that the feedback type of the first feedback is the feedback type determined by the sensing receiver, that is, the feedback type of the first feedback is determined by the third device, indicates only that the feedback type of the second feedback is the feedback type determined by the sensing receiver, that is, the feedback type of the second feedback is determined by the third device, or indicates that both the feedback type of the first feedback and the feedback type of the second feedback are determined by the third device.

Manner 4: The first information indicates that the feedback type of the first feedback is determined by the second device, and the feedback type of the second feedback is determined by the third device.

Manner 5: The first information indicates that the feedback type of the second feedback is determined by the second device, and the feedback type of the first feedback is determined by the third device.

Manner 6: The first information indicates that a feedback type of the first feedback and the feedback type of the second feedback are determined by the second device.

Manner 7: The first information indicates that a feedback type of the second feedback and the feedback type of the first feedback are determined by the second device.

Manner 8: The first information indicates that a feedback type of the first feedback and the feedback type of the second feedback are determined by the third device.

Manner 9: The first information indicates that a feedback type of the second feedback and the feedback type of the first feedback are determined by the third device.

Manner 10: The first information indicates that a feedback type of the first feedback and the feedback type of the second feedback are feedback types determined by any one of the sensing responder, the sensing transmitter, and the sensing receiver, that is, the feedback type of the second feedback is determined by either of the second device and the third device.

Manner 11: The first information indicates that the feedback type of the first feedback is determined by the second device, and the feedback type of the second feedback is determined by either of the second device and the third device.

Manner 12: The first information indicates that the feedback type of the first feedback is determined by the third device, and the feedback type of the second feedback is determined by either of the second device and the third device.

Manner 13: The first information indicates that a feedback type of the second feedback and the feedback type of the first feedback are feedback types determined by any one of the sensing responder, the sensing transmitter, and the sensing receiver, that is, the feedback type of the first feedback is determined by either of the second device and the third device.

Manner 14: The first information indicates that the feedback type of the second feedback is determined by the second device, and the feedback type of the first feedback is determined by either of the second device and the third device.

Manner 15: The first information indicates only that the feedback type of the first feedback is determined by either of the second device and the third device, indicates only that the feedback type of the second feedback is determined by either of the second device and the third device, or indicates that the feedback type of the first feedback is determined by either of the second device and the third device, and the feedback type of the second feedback is determined by either of the second device and the third device.

It should be noted that the first device may determine the foregoing plurality of indication manners of the first information based on one or more of the following: a status of the first device such as load or a packet loss rate, a status of the second device, a status of the third device, a service requirement of the first device, a service requirement of the second device, or a service requirement of the third device. This is not limited. In addition, for different application scenarios, the indication manners of the first information may also be different. For example, if a service of the first device has a requirement for a feedback type of a feedback, the first information may indicate the feedback type based on the service requirement, to meet the service requirement of the first device and ensure reliability of the service of the first device. For another example, if a service of the first device has no requirement on a feedback type of a feedback, the first information may indicate another device to determine a feedback type, so that the feedback can meet a service requirement of the another device, and reliability of a service of the another device is ensured.

It should be understood that, in the foregoing manners 1 to 3, if the first information indicates only the feedback type of the first feedback, or indicates only that the feedback type of the first feedback is determined by the second device or the third device, the feedback type of the second feedback may be determined by default, for example, predefined or preconfigured in a protocol. Alternatively, the feedback type of the second feedback may be determined by another device, for example, the second device or the third device. For example, the second device or the third device may send information, to indicate the feedback type of the second feedback, or indicate that the feedback type of the second feedback is determined by the second device or the third device. In an embodiment, refer to a related description in the following S603. Similarly, if the first information indicates only the feedback type of the second feedback, or indicates only that the feedback type of the second feedback is determined by the second device or the third device, the feedback type of the first feedback may be determined by default, for example, predefined or preconfigured in a protocol. Alternatively, the feedback type of the first feedback may be determined by another device, for example, the second device or the third device. For example, the second device or the third device may send information, to indicate that the information may indicate the feedback type of the first feedback, or indicate that the feedback type of the first feedback is determined by the second device or the third device. In an embodiment, refer to a related description in the following S603. In other words, if the first information indicates only feedback types of a part of all feedbacks, or indicates only that feedback types of a part of all feedbacks are determined by another device, a feedback type of a remaining feedback in all the feedbacks, that is, a feedback not indicated by the first information, may be determined by default or determined by another device.

It should be further understood that, in the manners 10 to 15, that the first information indicates that the feedback type of the first feedback is determined by either of the second device or the third device may be understood as that the first information does not indicate the feedback type of the first feedback, to have a same indication effect as that, in the manners 1 to 3, the first information indicates only the feedback type of the second feedback. In other words, the first information indicates that the feedback type of the first feedback may be determined by default, or may be determined by another device. Similarly, in the manners 10 to 15, that the first information indicates that the feedback type of the second feedback is determined by either of the second device or the third device may be understood as that the first information does not indicate the feedback type of the second feedback, to have a same indication effect as that, in the manners 1 to 3, the first information indicates only the feedback type of the first feedback. In other words, the first information indicates that the feedback type of the second feedback may be determined by default, or may be determined by another device. However, in the manners 1 to 3, the first information indicates only the feedback type of the first feedback, or indicates only the feedback type of the second feedback, compared with the manner in which all the feedback types are indicated in the manners 10 to 15, indication content carried in the first information may be reduced, to reduce a data size of the first information, and reduce communication overheads, so as to improve communication efficiency.

In summary, for the feedback type of the first feedback, the first information may indicate that the feedback type of the first feedback includes at least one of the following: the uncompressed CSI, the compressed CSI, the NDP, or the sensing measurement result, namely, the feedback type of the first feedback, and/or the feedback type of the first feedback includes at least one of the following: the feedback type determined by the sensing initiator, the feedback type determined by the sensing responder, the feedback type determined by the sensing transmitter, the feedback type determined by the sensing receiver, or the feedback type determined by the another device, that is, determined by the second device, the third device, or either of the second device and the third device. Similarly, for the feedback type of the second feedback, the first information may indicate that the feedback type of the second feedback includes at least one of the following: the uncompressed CSI, the compressed CSI, the NDP, or the sensing measurement result, namely, the feedback type of the second feedback, and/or the feedback type of the second feedback includes at least one of the following: the feedback type determined by the sensing initiator, the feedback type determined by the sensing responder, the feedback type determined by the sensing transmitter, the feedback type determined by the sensing receiver, or the feedback type determined by the another device, that is, determined by the second device, the third device, or either of the second device and the third device. Further, the following uses the first feedback and the second feedback as an example to describe an indication principle of the first information.

For example, the first information may include one or more fields, and each field may indicate a feedback type of one corresponding feedback in all feedbacks. For example, the first information includes a first field and/or a second field. The first field may indicate the feedback type of the first feedback. Similarly, the second field may indicate the feedback type of the second feedback. In this way, if the first device needs only to indicate the first feedback, the first device may send only the first field but not the second field. Similarly, if the first device needs only to indicate the second feedback, the first device may send only the second field but not the first field. This can avoid sending redundant information, thereby reducing communication overheads and improving communication efficiency.

For ease of understanding, the following uses the first field as an example for description. In an embodiment of the second field, refer to the following related description of the first field.

In an embodiment, the first field includes a plurality of bits, for example, 3 to 9 bits. In this way, the first field may indicate the feedback type of the first feedback based on an index including the plurality of bits, or indicate the feedback type of the first feedback based on a bitmap of the plurality of bits, or a bit, which is separately described below.

A. Index Indication

The plurality of bits may form different indexes, and the different indexes may indicate different feedback types of the first feedback. For example, it is shown in Table 1 below.

TABLE 1

| Index | Feedback type |
|---|---|
| 00000 | Uncompressed CSI |
| 00001 | Compressed CSI |
| 00010 | NDP |
| 00011 | Sensing measurement result |
| 00100 | Uncompressed CSI + compressed CSI |
| 00101 | Uncompressed CSI + NDP |
| 00110 | Uncompressed CSI + sensing measurement result |
| 00111 | Compressed CSI + NDP |
| 01000 | Compressed CSI + sensing measurement result |
| 01001 | NDP + sensing measurement result |
| 01010 | Uncompressed CSI + compressed CSI + NDP |
| 01011 | Uncompressed CSI + compressed CSI + sensing measurement result |
| 01100 | Uncompressed CSI + NDP + sensing measurement result |
| 01101 | Compressed CSI + NDP + sensing measurement result |
| 01110 | Uncompressed CSI + compressed CSI + NDP + sensing measurement result |
| 01111 | Feedback type determined by a sensing initiator |
| 10000 | Feedback type determined by a sensing responder |
| 10001 | Feedback type determined by a sensing transmitter |
| 10010 | Feedback type determined by a sensing receiver |
| 10011 | Feedback type determined/not determined by any device |

It can be learned from the table 1 that the foregoing index may include 5 bits, and indicate the various feedback types shown in the foregoing table 1. In this way, the first device may traverse the table 1, to determine an index corresponding to a feedback type that the first device wants to indicate, so as to generate the first information including the index, to indicate the feedback type that the first device wants to indicate.

For example, if the first device wants to indicate that the feedback type of the first feedback is the uncompressed CSI, the first device traverses the table 1 to generate the first information carrying the index 00000, to indicate that the feedback type of the first feedback is the uncompressed CSI.

For another example, if the first device wants to indicate that the feedback type of the first feedback includes the uncompressed CSI and the sensing measurement result, the first device traverses the table 1 to generate the first information carrying the index 00110, to indicate that the feedback type of the first feedback includes the uncompressed CSI and the sensing measurement result.

For still another example, if the first device wants to indicate that the feedback type of the first feedback is determined by the sensing transmitter (the sensing transmitter is the second device), the first device traverses the table 1 to generate the first information carrying the index 10001, to indicate that the feedback type of the first feedback is determined by the sensing transmitter. It can be learned that, in this case, because both the second device and the third device are sensing responders, or there are a plurality of sensing responders, the first device cannot determine an index by using the second device as the sensing responder, and needs to determine an index by using the second device as the sensing transmitter, to avoid incorrect determining and false indication.

It should be understood that an indication manner of each index in the foregoing table 1 is merely an example, and is not intended as a limitation. For example, an index in the table 1 may also indicate respective feedback types of a plurality of feedbacks at different levels, for example, indicate that a feedback type of a first-level feedback, for example, the first feedback is the uncompressed CSI, and indicate that a feedback type of a second-level feedback, for example, the second feedback is the compressed CSI. In addition, an order of values of the indexes in the table 1, namely, a binary ascending order, is merely an example, and is not intended as a limitation. For example, the indexes in the table 1 may alternatively obtain values in a binary descending order, or may obtain values randomly. This is not limited.

It should be noted that the indication manner in the foregoing table 1 is merely an example, and is not intended as a limitation. For example, the first information may further include a plurality of indexes, and each index indicates a feedback type, for example, the feedback type of the first feedback and/or the feedback type of the second feedback, and may be determined by an $N^{th}$ device corresponding to the index, where N is a positive integer. The $N^{th}$ device may be an $N^{th}$ device after a device corresponding to the index, or an $N^{th}$-hop device. For example, a hop count relationship of links is a first device→a second device→a third device. If it indicates that the feedback type of the first feedback is determined by the third device, the first information sent by the first device to the second device may include a first index and a second index. The first index corresponds to the first device, and indicates that the feedback type of the first feedback is determined by the second device (the third device). The second index corresponds to the second device, and indicates that the feedback type of the first feedback is determined by the first device (the third device). In this way, after the second device receives the first information, the second device sends the first information to the third device. The first information may include only the second index indicating that the feedback type of the first feedback is determined by the first device.

It should be understood that, during actual application, if a combination of various feedback types does not need to be indicated, it may be further shown in Table 2 below.

TABLE 2

| Index | Feedback type |
|---|---|
| 0000 | Uncompressed CSI |
| 0001 | Compressed CSI |
| 0010 | NDP |
| 0011 | Sensing measurement result |
| 0100 | Feedback type determined by a sensing initiator |
| 0101 | Feedback type determined by a sensing responder |
| 0110 | Feedback type determined by a sensing transmitter |
| 0111 | Feedback type determined by a sensing receiver |
| 1000 | Feedback type determined/not determined by any device |

It can be learned that the index in the table 2 is 4 bits. Compared with that the index in the table 1 is 5 bits, a data length of the index in the table 2 is shorter, and a data amount of the index in the table 2 is smaller. Therefore, communication overheads can be reduced, to improve communication efficiency.

It should be further understood that, during actual application, if a combination of various feedback types and a device by which the feedback type is determined do not need to be indicated, it may be shown in Table 3 below.

TABLE 3

| Index | Feedback type |
|---|---|
| 000 | Uncompressed CSI |
| 001 | Compressed CSI |
| 010 | NDP |
| 011 | Sensing measurement result |
| 100 | Feedback type determined/not determined by any device |

It can be learned that, compared with that the index in the table 2 is 4 bits, a data length of the index in the table 3 is further shortened to 3 bits, so that communication overheads can be further reduced, to further improve communication efficiency.

B. Bitmap Indication

The first field includes a plurality of bits, and each bit may indicate a feedback type. For example, it is shown in Table 4 below.

TABLE 4

| Bitmap | Feedback type |
|---|---|
| 100000000 | Uncompressed CSI |
| 010000000 | Compressed CSI |
| 001000000 | NDP |
| 000100000 | Sensing measurement result |
| 110000000 | Uncompressed CSI + compressed CSI |
| 101000000 | Uncompressed CSI + NDP |
| 100100000 | Uncompressed CSI + sensing measurement result |
| 011000000 | Compressed CSI + NDP |
| 010100000 | Compressed CSI + sensing measurement result |
| 001100000 | NDP + sensing measurement result |
| 100000000 | Uncompressed CSI + compressed CSI + NDP |
| 111000000 | Uncompressed CSI + compressed CSI + sensing measurement result |
| 110100000 | Uncompressed CSI + NDP + sensing measurement result |
| 011100000 | Compressed CSI + NDP + sensing measurement result |
| 111100000 | Uncompressed CSI + compressed CSI + NDP + sensing measurement result |
| 000010000 | Feedback type determined by a sensing initiator |
| 000001000 | Feedback type determined by a sensing responder |
| 000000100 | Feedback type determined by a sensing transmitter |
| 000000010 | Feedback type determined by a sensing receiver |
| 000000001 | Feedback type determined/not determined by any device |

It can be learned from the table 4 that the bitmap in the table 4 may include 9 bits. In an order from left to right, each of the 9 bits may indicate a feedback type. For example, a first bit may indicate whether the feedback type of the first feedback includes the uncompressed CSI. When the first bit is 1, it indicates that the uncompressed CSI is included, and when the first bit is 0, it indicates that the uncompressed CSI is not included. A second bit may indicate whether the feedback type of the first feedback includes the compressed CSI. When the second bit is 1, it indicates that the compressed CSI is included, and when the second bit is 0, it indicates that the compressed CSI is not included. A third bit may indicate whether the feedback type of the first feedback includes the NDP. When the third bit is 1, it indicates that the NDP is included, and when the third bit is 0, it indicates that the NDP is not included. By analogy, a ninth bit may indicate whether the first information does not indicate the feedback type. When the ninth bit is 1, it indicates that the first information does not indicate the feedback type of the first feedback, and when the ninth bit is 0, it indicates that the first information indicates the feedback type of the first feedback.

Further, the first device may traverse the table 4, to determine a bitmap corresponding to a feedback type that the first device wants to indicate, so as to generate the first information carrying the bitmap, to indicate the feedback type that the first device wants to indicate.

For example, if the first device wants to indicate that the feedback type of the first feedback is the uncompressed CSI, the first device traverses the table 1 to generate the first information carrying the bitmap 100000000, to indicate that the feedback type of the first feedback is the uncompressed CSI.

For another example, if the first device wants to indicate that the feedback type of the first feedback includes the uncompressed CSI and the sensing measurement result, the first device traverses the table 1 to generate the first information carrying the bitmap 100100000, to indicate that the feedback type of the first feedback includes the uncompressed CSI and the sensing measurement result.

For still another example, if the first device wants to indicate that the feedback type of the first feedback is determined by the sensing transmitter (the second device is the sensing transmitter), the first device traverses the table 1 to generate the first information carrying the bitmap 000000100, to indicate that the feedback type of the first feedback is determined by the sensing transmitter. It can be learned that, in this case, because both the second device and the third device are sensing responders, the first device cannot determine the bitmap by using the second device as the sensing responder, and needs to determine the bitmap by using the second device as the sensing transmitter, to avoid incorrect determining and false indication.

It should be understood that, during actual application, if a combination of various feedback types does not need to be indicated, it may be shown in Table 5 below.

TABLE 5

| Bitmap | Feedback type |
|---|---|
| 100000000 | Uncompressed CSI |
| 010000000 | Compressed CSI |
| 001000000 | NDP |
| 000100000 | Sensing measurement result |
| 000010000 | Feedback type determined by a sensing initiator |
| 000001000 | Feedback type determined by a sensing responder |
| 000000100 | Feedback type determined by a sensing transmitter |
| 000000010 | Feedback type determined by a sensing receiver |
| 000000001 | Feedback type determined/not determined by any device |

It can be learned that, compared with that the table 4 includes 21 bitmaps, the table 5 includes only 9 bitmaps, so that the first device can more quickly determine a corresponding bitmap by traversing the table 5, to improve processing efficiency.

It should be further understood that, during actual application, if a combination of various feedback types and a device by which the feedback type is determined do not need to be indicated, it may be shown in Table 6 below.

TABLE 6

| Bitmap | Feedback type |
|---|---|
| 10000 | Uncompressed CSI |
| 01000 | Compressed CSI |
| 00100 | NDP |
| 00010 | Sensing measurement result |
| 00001 | Feedback type determined by a sensing initiator |

It can be learned that the bitmap in the table 6 has 5 bits. Compared with that the bitmap in the table 5 has 9 bits, the bitmap in the table 6 has a shorter data length and a smaller data amount. Therefore, communication overheads can be reduced, to improve communication efficiency.

It should be noted that, because the first feedback may be a feedback sent by the third device to the second device, and the second feedback may be a feedback sent by the second device to the first device, after receiving the first feedback, the second device may determine the second feedback based on the first feedback. In other words, the second feedback is based on the first feedback. Therefore, the feedback type of the first feedback and the feedback type of the second feedback need to meet determining logic between the first feedback and the second feedback. For example, on the basis that the determining logic is NDP→CSI→sensing measurement result, if the feedback type of the first feedback is an NDP, the feedback type of the second feedback may include one or more of the following: the NDP, the CSI such as compressed CSI or uncompressed CSI, or the measurement result. However, if the feedback type of the first feedback is CSI, the feedback type of the second feedback may include one or more of the following: the CSI or the measurement result, but does not include an NDP.

S602: The first device sends the first frame, and the second device receives the first frame.

The first frame includes the first information, and the first information may be carried in one or more of the following: signaling in a sensing setup phase such as a sensing setup request message and a sensing setup reception message or signaling in a sensing measurement phase such as a sensing request message, to reuse signaling, so as to reduce communication overheads and improve communication efficiency.

Further, the first device may send the first frame, so that the second device may receive the first frame. In this way, the second device may determine the feedback type of the first feedback and/or the feedback type of the second feedback based on the first information in the first frame. In an embodiment, refer to a related description in the following second application scenario. Details are not described herein.

In an embodiment, in a first application scenario, the first frame may further include mode indication information. The mode indication information may indicate that the first information indicates any one of the following: the feedback type of the first feedback, the feedback type of the second feedback, or the feedback type of the first feedback and the feedback type of the second feedback. In this way, a receiver device such as the second device can accurately determine indication content of the first information based on the mode indication information, to avoid a false feedback caused by incorrectly determining the indication content of the first information, so as to improve stability of measurement.

In an embodiment, in the second application scenario, after S602, the feedback indication method may further include: Operation 1: The second device sends second information and/or second information to the third device, and the third device receives the first information and/or the second information from the second device.

The second information may perform indicating independently, that is, content indicated by the second information and content indicated by the first information are independent of each other, may be the same, or may be different. Alternatively, the second information may be used together with the first information for indication. For example, the second information may indicate a feedback type of another feedback, or indicate that a feedback type of another feedback is determined by another device. The another feedback may be a feedback that is not indicated by the first information in all feedbacks, and/or the first information indicates the feedback determined by the another device.

The first feedback and the second feedback are used as an example. If the first information does not indicate the feedback type of the first feedback or indicates that the feedback type of the first feedback includes a feedback type determined by the sensing transmitter (the second device), the second information may indicate any one of the following: the feedback type of the first feedback (including at least one of the following: the uncompressed CSI, the compressed CSI, the NDP, or the sensing measurement result), the feedback type of the first feedback is determined by the sensing receiver, that is, the feedback type of the first feedback is determined by the third device, or the sensing transmitter does not determine the feedback type of the first feedback (the feedback type of the first feedback is determined by any one of other devices). If the first information does not indicate the feedback type of the first feedback or indicates that the feedback type of the second feedback includes a feedback type determined by the sensing transmitter (the second device), the first information may further indicate any one of the following: the feedback type of the second feedback is determined by the sensing receiver, that is, the feedback type of the second feedback is determined by the third device, or the sensing transmitter (the second device) does not determine the feedback type of the second feedback (the feedback type of the second feedback is determined by any one of other devices).

It should be understood that in an embodiment principle of the second information, refer to the related description of the first information in S601. Details are not described herein again. In addition, the first information and/or the second information sent by the second device may carry at least one of the following: the signaling in the sensing measurement phase such as an NDPA or an NDP or signaling in a sensing reporting phase such as a feedback request message, to reuse signaling, so as to reduce communication overheads and improve communication efficiency.

Further, it can be learned from the related description in S601 that there may be a plurality of indication manners of the first information, for example, the foregoing manners 1 to 15. Therefore, the second device may determine, based on the various indication manners in the foregoing manners 1 to 15, to send the first information and/or the second information. The following provides description in detail.

Manner 1

In a first implementation, if the first information indicates only the feedback type of the first feedback, the feedback type of the second feedback may be determined based on protocol predefinition, for example, determined by the sensing transmitter, namely, the second device. In this way, in one aspect, the second device may forward the first information (including the first field and the second field) to the third device based on the first information, or send only the first field but not the second field, to indicate the feedback type of the first feedback. In another aspect, the second device may determine, based on a status of the second device and/or a service requirement of the second device, that the feedback type of the second feedback or the feedback type of the second feedback is a feedback type determined by the sensing receiver, that is, the feedback type of the second feedback is determined by the third device, to send the second information to the third device, so as to indicate that the feedback type of the second feedback is determined by the third device. In other words, in this case, the second device may send the first information and the second information to the third device. The first information and the second information may be sent in a packaged manner, or sent separately. This is not limited.

In a second implementation, if the first information indicates only the feedback type of the second feedback (including at least one of the following: the uncompressed CSI, the compressed CSI, the NDP, or the sensing measurement result), the feedback type of the first feedback may be determined based on protocol predefinition, for example, determined by the second device. In this way, the second device may determine, based on a status of the second device and/or a service requirement of the second device, that the feedback type of the first feedback or the feedback type of the first feedback is determined by the third device, to send the second information to the third device, so as to indicate that the feedback type of the first feedback or the feedback type of the first feedback is determined by the third device.

In a third implementation, the first information indicates the feedback type of the first feedback and the feedback type of the second device. In this way, the second device may forward the first information to the third device based on the first information, or send only the first field but not the second field, to indicate the feedback type of the first feedback.

Manner 2

In a fourth implementation, the first information indicates only that the feedback type of the first feedback is determined by the second device. In this way, in one aspect, the second device may determine, based on the first information, that the feedback type of the first feedback or the feedback type of the first feedback is determined by the third device, to send the second information to the third device, so as to indicate that the feedback type of the first feedback or the feedback type of the first feedback is determined by the third device. In another aspect, for the second feedback that is not indicated by the first information, it can be learned from the related description in the first implementation that the second device may send the second information to the third device, to indicate that the feedback type of the second feedback is determined by the third device. In other words, in this case, the second information may indicate that the feedback type of the first feedback or the feedback type of the first feedback is determined by the third device. In an embodiment, the second information may further indicate that the feedback type of the second feedback is determined by the third device.

In a fifth implementation, the first information indicates only that the feedback type of the second feedback is determined by the second device. In this way, in one aspect, the second device may determine, based on the first information, that the feedback type of the second feedback or the feedback type of the second feedback is determined by the third device, to send the second information to the third device, so as to indicate that the feedback type of the second feedback is determined by the third device. In another aspect, for the first feedback that is not indicated by the first information, it can be learned from the related description in the second implementation that the second device may send the second information to the third device, to indicate that the feedback type of the first feedback or the feedback type of the first feedback is determined by the third device. In other words, in this case, the second information may indicate that the feedback type of the second feedback is determined by the third device. In an embodiment, the second information may further indicate that the feedback type of the first feedback or the feedback type of the first feedback is determined by the third device.

In a sixth implementation, the first information indicates that both the feedback type of the first feedback and the feedback type of the second feedback are determined by the second device. In this way, the second device may determine, based on the first information, that the feedback type of the first feedback or the feedback type of the first feedback is determined by the third device. In addition, the second device may further determine, based on the first information, that the feedback type of the second feedback or the feedback type of the second feedback is determined by the third device. Therefore, the second device may send the second information to the third device, to indicate that the feedback type of the first feedback or the feedback type of the first feedback is determined by the third device. In an embodiment, the second information further indicates that the feedback type of the second feedback is determined by the third device.

Manner 3

In a seventh implementation, the first information indicates only that the feedback type of the first feedback is determined by the third device. In this way, in one aspect, the second device may forward the first information to the third device based on the first information, or send only the first field but not the second field, to indicate that the feedback type of the first feedback is determined by the third device. In another aspect, for the second feedback that is not indicated by the first information, it can be learned from the related description in the first implementation that the second device may send the second information to the third device, to indicate that the feedback type of the second feedback is determined by the third device.

In an eighth implementation, the first information indicates only that the feedback type of the second feedback is determined by the third device. In this way, in one aspect, the second device may forward the first information to the third device based on the first information, or send only the second field but not the first field, to indicate that the feedback type of the second feedback is determined by the third device. In another aspect, for the first feedback that is not indicated by the first information, it can be learned from the related description in the second implementation that the second device may send the second information to the third device, to indicate that the feedback type of the first feedback or the feedback type of the first feedback is determined by the third device.

In a ninth implementation, the first information indicates that both the feedback type of the first feedback and the feedback type of the second feedback are determined by the third device. In this way, the second device may forward the first information to the third device based on the first information, to indicate that both the feedback type of the first feedback and the feedback type of the second feedback are determined by the third device.

Manner 4

The first information indicates that the feedback type of the first feedback is determined by the second device, and the feedback type of the second feedback is determined by the third device. In this way, in one aspect, the second device may determine, based on the first information, that the feedback type of the first feedback or the feedback type of the first feedback is determined by the third device, to send the second information to the third device, so as to indicate that the feedback type of the first feedback or the feedback type of the first feedback is determined by the third device. In another aspect, the second device may forward the first information to the third device based on the first information, or send only the second field but not the first field, to indicate that the feedback type of the second feedback is determined by the third device.

Manner 5

The first information indicates that the feedback type of the second feedback is determined by the second device, and the feedback type of the first feedback is determined by the third device. In this way, in one aspect, the second device may determine, based on the first information, that the feedback type of the second feedback or the feedback type of the second feedback is determined by the third device, to send the second information to the third device, so as to indicate that the feedback type of the second feedback is determined by the third device. In another aspect, the second device may forward the first information to the third device based on the first information, or send only the first field but not the second field, to indicate that the feedback type of the first feedback is determined by the third device.

Manner 6

The first information indicates that the feedback type of the first feedback and the feedback type of the second feedback are determined by the second device. In this way, in one aspect, the second device may forward the first information to the third device based on the first information, or send only the first field but not the second field, to indicate the feedback type of the first feedback. In another aspect, the second device may determine, based on the first information, that the feedback type of the second feedback or the feedback type of the second feedback is determined by the third device, to send the second information to the third device, so as to indicate that the feedback type of the second feedback is determined by the third device.

Manner 7

The first information indicates that the feedback type of the second feedback and the feedback type of the first feedback are determined by the second device. In this way, the second device may determine, based on the first information, that the feedback type of the first feedback or the feedback type of the first feedback is determined by the third device, to send the second information to the third device, so as to indicate that the feedback type of the first feedback or the feedback type of the first feedback is determined by the third device.

Manner 8

The first information indicates that the feedback type of the first feedback and the feedback type of the second feedback are determined by the third device. In this way, the second device may forward the first information to the third device based on the first information, to indicate that the feedback type of the first feedback and the feedback type of the second feedback are determined by the third device.

Manner 9

The first information indicates that the feedback type of the second feedback and the feedback type of the first feedback are determined by the third device. In this way, the second device may forward the first information to the third device based on the first information, or send only the first field but not the second field, to indicate that the feedback type of the first feedback is determined by the third device.

Manner 10

The first information indicates that the feedback type of the first feedback and the feedback type of the second feedback are determined by either of the second device and the third device. In this way, in one aspect, the second device may forward the first information to the third device based on the first information, or send only the first field but not the second field, to indicate the feedback type of the first feedback. In another aspect, the second device may determine, based on the first information, that the feedback type of the second feedback and the feedback type of the second feedback are determined by the third device, or the second device does not determine the feedback type of the second feedback. If the feedback type of the second feedback is determined by the third device, or the second device does not determine the feedback type of the second feedback, the second device may further send the second information to the third device, to indicate that the feedback type of the second feedback is determined by the third device, or the second device does not determine the feedback type of the second feedback.

Manner 11

The first information may indicate that the feedback type of the first feedback is determined by the second device, and the feedback type of the second feedback is determined by either of the second device and the third device. In this way, in one aspect, the second device may determine, based on the first information, that the feedback type of the first feedback or the feedback type of the first feedback is determined by the third device, to send the second information to the third device, so as to indicate that the feedback type of the first feedback or the feedback type of the first feedback is determined by the third device. In another aspect, for the second feedback, it can be learned from the related description in the manner 10 in the second application scenario that the second device may send the second information to the third device, to indicate that the feedback type of the second feedback is determined by the third device, or the second device does not determine the feedback type of the second feedback. In other words, in this case, the second information may indicate that the feedback type of the first feedback or the feedback type of the first feedback is determined by the third device. In an embodiment, the second information may further indicate that the feedback type of the second feedback is determined by the third device, or the second device does not determine the feedback type of the second feedback.

Manner 12

The first information indicates that the feedback type of the first feedback is determined by the third device, and the feedback type of the second feedback is determined by either of the second device and the third device. In this way, in one aspect, the second device may forward the first information to the third device based on the first information, or send only the first field but not the second field, to indicate that the feedback type of the first feedback is determined by the third device. In another aspect, for the second feedback, it can be learned from the related description in the manner 10 in the second application scenario that the second device may send the second information to the third device, to indicate that the feedback type of the second feedback is determined by the third device, or the second device does not determine the feedback type of the second feedback.

Manner 13

The first information indicates that the feedback type of the second feedback and the feedback type of the first feedback are determined by either of the second device and the third device. In this way, the second device may determine, based on the first information, that the feedback type of the first feedback and the feedback type of the first feedback are determined by the third device, or the second device does not determine the feedback type of the first feedback, to send the second information to the third device, so as to indicate that the feedback type of the first feedback and the feedback type of the first feedback are determined by the third device, or the second device does not determine the feedback type of the first feedback.

Manner 14

The first information indicates that the feedback type of the second feedback is determined by the second device, and the feedback type of the first feedback is determined by either of the second device and the third device. In this way, in one aspect, the second device may determine, based on the first information, that the feedback type of the second feedback or the feedback type of the second feedback is determined by the third device, to send the second information to the third device, so as to indicate that the feedback type of the second feedback is determined by the third device. In another aspect, for the first feedback, it can be learned from the related description in the manner 13 in the second application scenario that the second device may send the second information to the third device, to indicate that the feedback type of the first feedback and the feedback type of the first feedback are determined by the third device, or the second device does not determine the feedback type of the first feedback. In other words, in this case, the second information may indicate that the feedback type of the first feedback and the feedback type of the first feedback are determined by the third device, or the second device does not determine the feedback type of the first feedback. In an embodiment, the second information further indicates that the feedback type of the second feedback is determined by the third device.

Manner 15

In a tenth implementation, the first information indicates only that the feedback type of the first feedback is determined by either of the second device and the third device. In this way, in one aspect, for the first feedback, it can be learned from the related description in the manner 13 in the second application scenario that the second device may send the second information to the third device, to indicate that the feedback type of the first feedback and the feedback type of the first feedback are determined by the third device, or the second device does not determine the feedback type of the first feedback. In another aspect, for the second feedback that is not indicated by the first information, it can be learned from the related description in the first implementation that the second device may send the second information to the third device, to indicate that the feedback type of the second feedback is determined by the third device. In other words, in this case, the second information may indicate that the feedback type of the first feedback and the feedback type of the first feedback are determined by the third device, or the second device does not determine the feedback type of the first feedback. In an embodiment, the second information may further indicate that the feedback type of the second feedback is determined by the third device.

In an eleventh implementation, the first information indicates only that the feedback type of the second feedback is determined by either of the second device and the third device. In this way, in one aspect, for the second feedback, it can be learned from the related description in the manner 10 in the second application scenario that the second device may send the second information to the third device, to indicate that the feedback type of the second feedback is determined by the third device, or the second device does not determine the feedback type of the second feedback. In another aspect, for the first feedback that is not indicated by the first information, it can be learned from the related description in the second implementation that the second device may send the second information to the third device, to indicate that the feedback type of the first feedback or the feedback type of the first feedback is determined by the third device. In other words, in this case, the second information may indicate that the feedback type of the second feedback is determined by the third device, or the second device does not determine the feedback type of the second feedback. In an embodiment, the second information may further indicate that the feedback type of the first feedback or the feedback type of the first feedback is determined by the third device.

In a twelfth implementation, the first information indicates that the feedback type of the first feedback is determined by either of the second device and the third device, and the feedback type of the second feedback is determined by either of the second device and the third device. In this way, in an embodiment of the first feedback, refer to the tenth implementation, and in an embodiment of the second feedback, refer to the eleventh implementation.

It can be learned that, in the manners 1 to 15 in the second application scenario, if the second device needs only to indicate the feedback type of the first feedback, the second device may send only the first field but not the second field. Similarly, if the second device needs only to indicate the feedback type of the second feedback, the second device may send only the second field but not the first field. This can avoid sending redundant information, thereby reducing communication overheads and improving communication efficiency.

In an embodiment, with reference to the second application scenario, in the second application scenario, after the operation 1, the feedback indication method may further include: Operation 2: The third device sends third information to the second device, and the second device receives the third information from the third device.

The third information may indicate that the feedback type of the second feedback includes at least one of the following: the uncompressed CSI, the compressed CSI, the NDP, or the sensing measurement result, that is, indicate the feedback type of the second feedback, and may be carried in the signaling in the sensing reporting phase, like the first feedback, to reuse signaling, so as to reduce communication overheads and improve communication efficiency.

In an embodiment, with reference to S601 and the related descriptions in the manners 1 to 15 in the second application scenario, it can be learned that if the first information and/or the second information sent by the second device to the third device indicate/indicates that the feedback type of the second feedback is determined by the third device, the third device may determine the feedback type of the second feedback based on a status of the third device and/or a service requirement of the third device, to send the third information to the second device, so as to indicate the feedback type of the second feedback. In addition, if the first information and/or the second information sent by the second device to the third device further indicate/indicates that the feedback type of the first feedback is determined by the third device, the third device may further determine the feedback type of the first feedback based on a status of the third device and/or a service requirement of the third device.

It should be understood that S601 and S602, and the first application scenario to the second application scenario are examples of interaction between the first device, the second device, and the third device, and are not intended as a limitation. For example, the second device may generate the first information, and send the first information to the first device and the third device. For another example, the third device may generate the first information, and send the first information to the second device, so that the second device sends the first information to the first device.

The foregoing describes in detail an overall procedure of the feedback indication method provided in an embodiment of the application with reference to FIG. 6. The following describes in detail a procedure of the feedback indication method shown in FIG. 6 in a scenario A to a scenario C with reference to FIG. 7 to FIG. 22.

Scenario A

Figure 7:
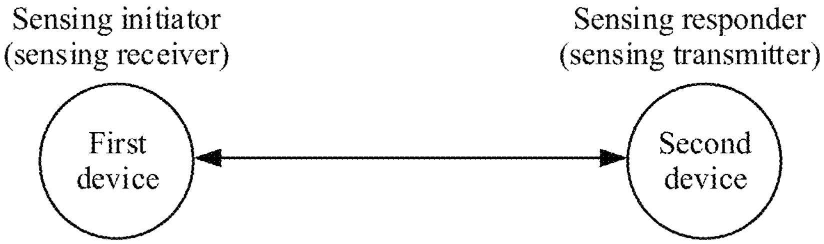
FIG. 7 is a schematic diagram of an architecture of a scenario A.
Figure 8:
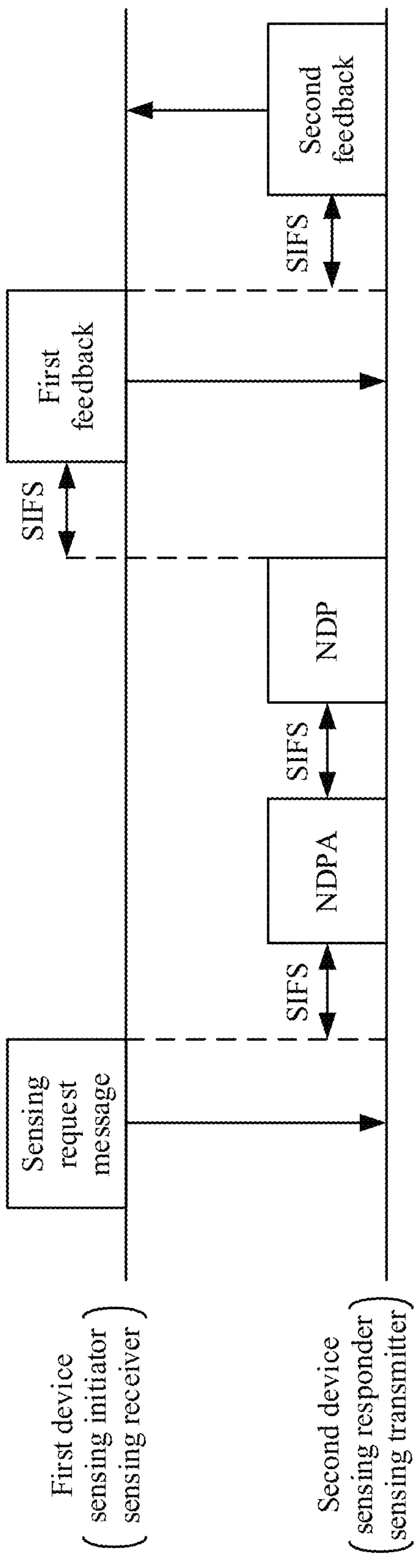
FIG. 8 is a schematic flowchart 1 of a feedback indication method in a scenario A according to an embodiment of this application.

For example, FIG. 7 is a schematic diagram of an architecture of a scenario A, and FIG. 8 is a schematic flowchart 1 of the feedback indication method in the scenario A. As shown in FIG. 7 and FIG. 8, devices for performing the method may include a first device and a second device. The first device may be a sensing initiator of a sensing receiver. The second device may be one or more sensing responders of a sensing transmitter. In this way, the feedback indication method may include two levels of feedbacks. One level of feedback is a first feedback sent by the first device to the second device, and the other level of feedback is a second feedback sent by the second device to the first device. In this case, a feedback type may be determined in three manners (determining manners 1 to 3). Determining manner 1: The first device determines feedback types of the first feedback and the second feedback. Determining manner 2: The first device determines a feedback type of the first feedback, and the second device determines a feedback type of the second feedback. Determining manner 3: The first device determines a feedback type of the second feedback, and the second device determines a feedback type of the first feedback. The following describes in detail procedures respectively corresponding to the foregoing determining manners 1 to 3.

Determining Manner 1

Figure 9:
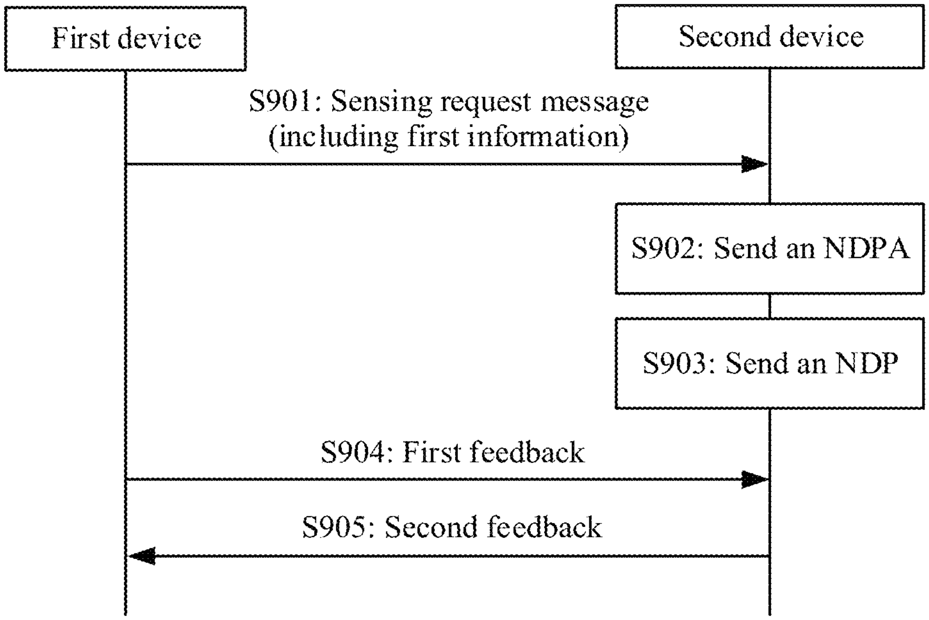
FIG. 9 is a schematic flowchart 2 of a feedback indication method in a scenario A according to an embodiment of this application.

FIG. 9 is a schematic flowchart 2 of the feedback indication method in the scenario A. As shown in FIG. 9, a sensing measurement phase and a sensing reporting phase are used as an example. The feedback indication method may include the following operations.

S901: A first device sends a sensing request message to a second device, and the second device receives the sensing request message from the first device.

The sensing request message may include the foregoing first information. The first information includes a first field and a second field. The first field may indicate the feedback type of the first feedback, for example, CSI. The second field may indicate the feedback type of the second feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S902: The second device sends an NDPA.

As shown in FIG. 8, after receiving a sensing request message, the second device may send an NDPA based on the sensing request message. For example, after receiving the sensing request message, the second device sends the NDPA after one SIFS. In addition, in an embodiment of the NDPA, refer to the related description in S202. Details are not described herein again.

S903: The second device sends an NDP.

As shown in FIG. 8, after sending the NDPA, the second device may send an NDP after one SIFS.

It should be noted that the NDPA and the NDP sent by the second device may or may not carry the foregoing first information. This is not limited.

S904: The first device sends the first feedback to the second device, and the second device receives the first feedback from the first device.

The first device may determine the first feedback, for example, the CSI, based on the feedback type indicated by the first field.

In addition, as shown in FIG. 8, because the first device is not only the sensing initiator, but also the sensing receiver, the first device may send the first feedback to the second device, namely, the sensing responder of the sensing transmitter. For example, after the NDP is sent, the first feedback is sent after one SIFS.

S905: The second device sends the second feedback to the first device, and the first device receives the second feedback from the second device.

As shown in FIG. 8, the second device may determine the second feedback, namely, a sensing measurement result, based on the feedback type indicated by the second field, for example, the sensing measurement result, and the first feedback, for example, the CSI. In an embodiment, refer to the related description in the foregoing second application scenario. Details are not described herein again. In this way, after receiving the first feedback, the second device may send the second feedback to the second device after one SIFS.

Determining Manner 2

Figure 10:
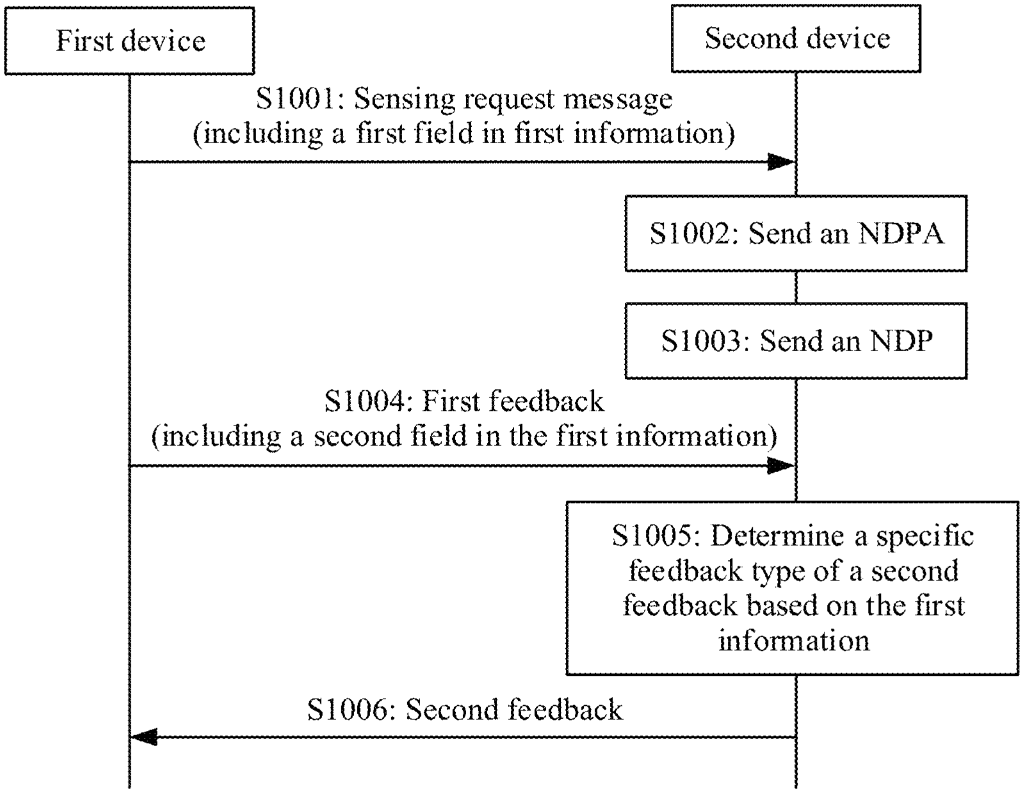
FIG. 10 is a schematic flowchart 3 of a feedback indication method in a scenario A according to an embodiment of this application.

FIG. 10 is a schematic flowchart 3 of the feedback indication method in the scenario A. As shown in FIG. 10, a sensing measurement phase and a sensing reporting phase are used as an example. The feedback indication method may include the following operations.

S1001: A first device sends a sensing request message to a second device, and the second device receives the sensing request message from the first device.

The sensing request message may include a first field in the foregoing first information. The first field may indicate the feedback type of the first feedback, for example, CSI. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S1002: The second device sends an NDPA.

S1003: The second device sends an NDP.

In an embodiment of S1002, refer to the related descriptions in S202 and S902. In an embodiment of S1003, refer to the related descriptions in S202 and S903. Details are not described herein again.

S1004: The first device sends the first feedback to the second device, and the second device receives the first feedback from the first device.

As shown in FIG. 8, the first device may determine the first feedback, for example, the CSI, based on the feedback type indicated by the first field, so that after the NDP is sent, the first feedback is sent to the second device after one SIFS.

The first feedback may include a second field in the foregoing first information, and indicate that a feedback type of the second feedback is determined by the second device. In an embodiment, refer to the related descriptions in S601 and S602. Details are not described herein again.

In other words, the first feedback and the second feedback may be separately indicated. For example, the first feedback is indicated by using a sensing request message, and the second feedback is indicated by using the first feedback, to avoid packet loss caused by an excessively large data packet sent at a time, so as to improve reliability of communication.

It should be understood that the foregoing separate indication manner is merely an example, and is not intended as a limitation. For example, the first feedback and the second feedback may also be indicated together. For example, the sensing request message may also include the first field and the second field.

S1005: The second device determines the feedback type of the second feedback based on the first information.

The second device may determine the feedback type of the second feedback, for example, a sensing measurement result, based on the second field in the first information. In an embodiment, refer to the related description in the foregoing second application scenario. Details are not described herein again. In this way, the second device may determine the second feedback, namely, the sensing measurement result, based on the received first feedback, for example, the CSI, and the feedback type of the second feedback.

S1006: The second device sends the second feedback to the first device, and the first device receives the feedback from the second device.

As shown in FIG. 8, after receiving the first feedback, the second device may send the second feedback to the second device after one SIFS.

Determining Manner 3

Figure 11:
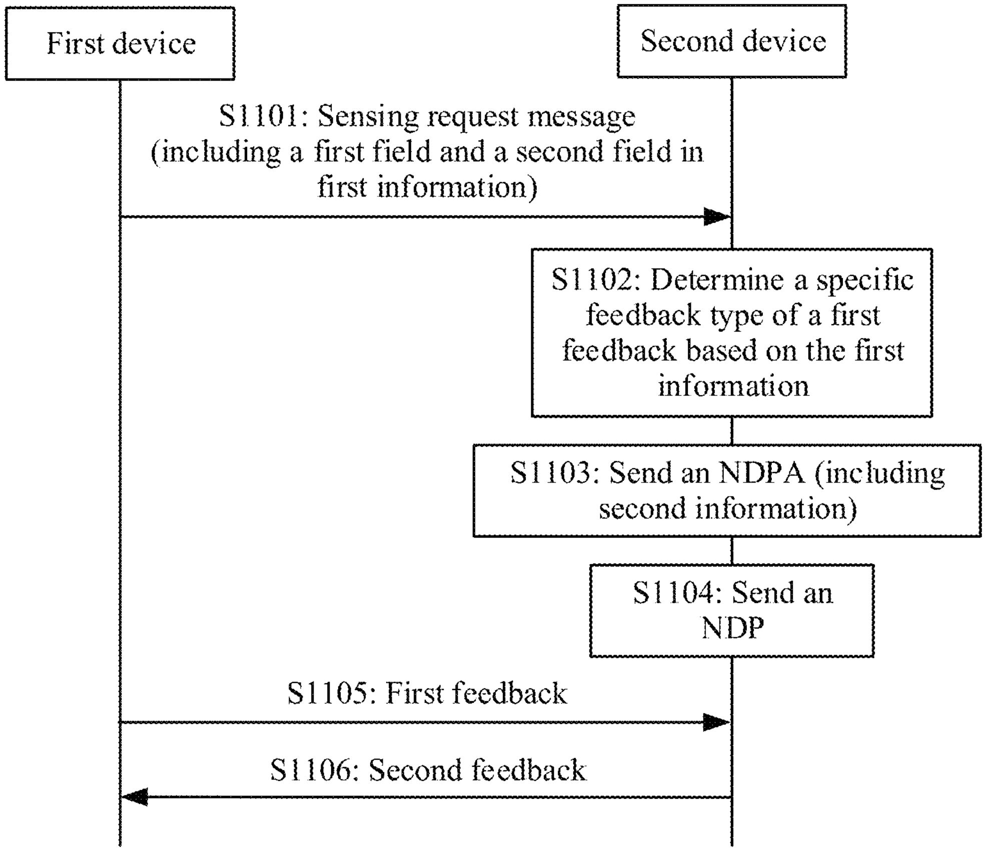
FIG. 11 is a schematic flowchart 4 of a feedback indication method in a scenario A according to an embodiment of this application.

FIG. 11 is a schematic flowchart 4 of the feedback indication method in the scenario A. As shown in FIG. 11, a sensing measurement phase and a sensing reporting phase are used as an example. The feedback indication method may include the following operations.

S1101: A first device sends a sensing request message to a second device, and the second device receives the sensing request message from the first device.

The sensing request message may include a first field and a second field in the foregoing first information. The first field may indicate that a feedback type of the first feedback is determined by the second device, and the second field may indicate the feedback type of the second feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S1102: The second device determines the feedback type of the first feedback based on the first information.

After receiving the sensing request message, the second device may determine the feedback type of the first feedback, for example, CSI, based on the first field in the first information. In an embodiment, refer to the related description in the foregoing second application scenario. Details are not described herein again.

S1103: The second device sends an NDPA.

S1104: The second device sends an NDP.

The foregoing second information may be carried in the NDPA sent by the second device, to indicate the feedback type of the first feedback, but is not limited. For example, the second information may alternatively be carried in the NDP. In other words, S1102 is performed before S1104.

In addition, in an embodiment of S1103 and S1104, refer to the related descriptions in S202, and S902 and S903. Details are not described herein again.

S1105: The first device sends the first feedback to the second device, and the second device receives the first feedback from the first device.

As shown in FIG. 8, the first device may determine the first feedback, for example, the CSI, based on the feedback type indicated by the second information, so that after the NDP is sent, the first feedback is sent after one SIFS.

S1106: The second device sends the second feedback to the first device, and the first device receives the feedback from the second device.

As shown in FIG. 8, the second device may determine the second feedback, namely, a sensing measurement result, based on the feedback type indicated by the second field, for example, the sensing measurement result, and the first feedback, for example, the CSI. In an embodiment, refer to the related description in the foregoing second application scenario. Details are not described herein again. In this way, after receiving the first feedback, the second device may send the second feedback after one SIFS.

It should be understood that, in the foregoing scenario A, in addition to the foregoing determining manners A to C, there may be another determining manner, for example, the second device determines the feedback type of the first feedback and the feedback type of the second feedback. In an embodiment, refer to the related descriptions in the foregoing determining manners A to C. Details are not described herein again.

Scenario B

Figure 12:
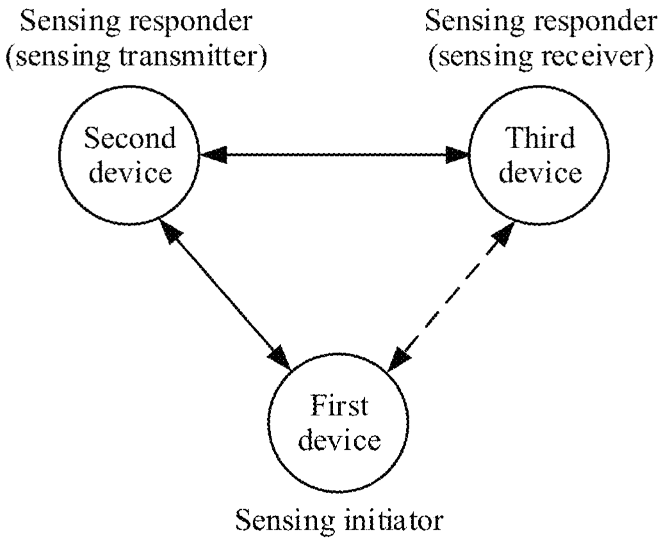
FIG. 12 is a schematic diagram of an architecture of a scenario B.
Figure 13:
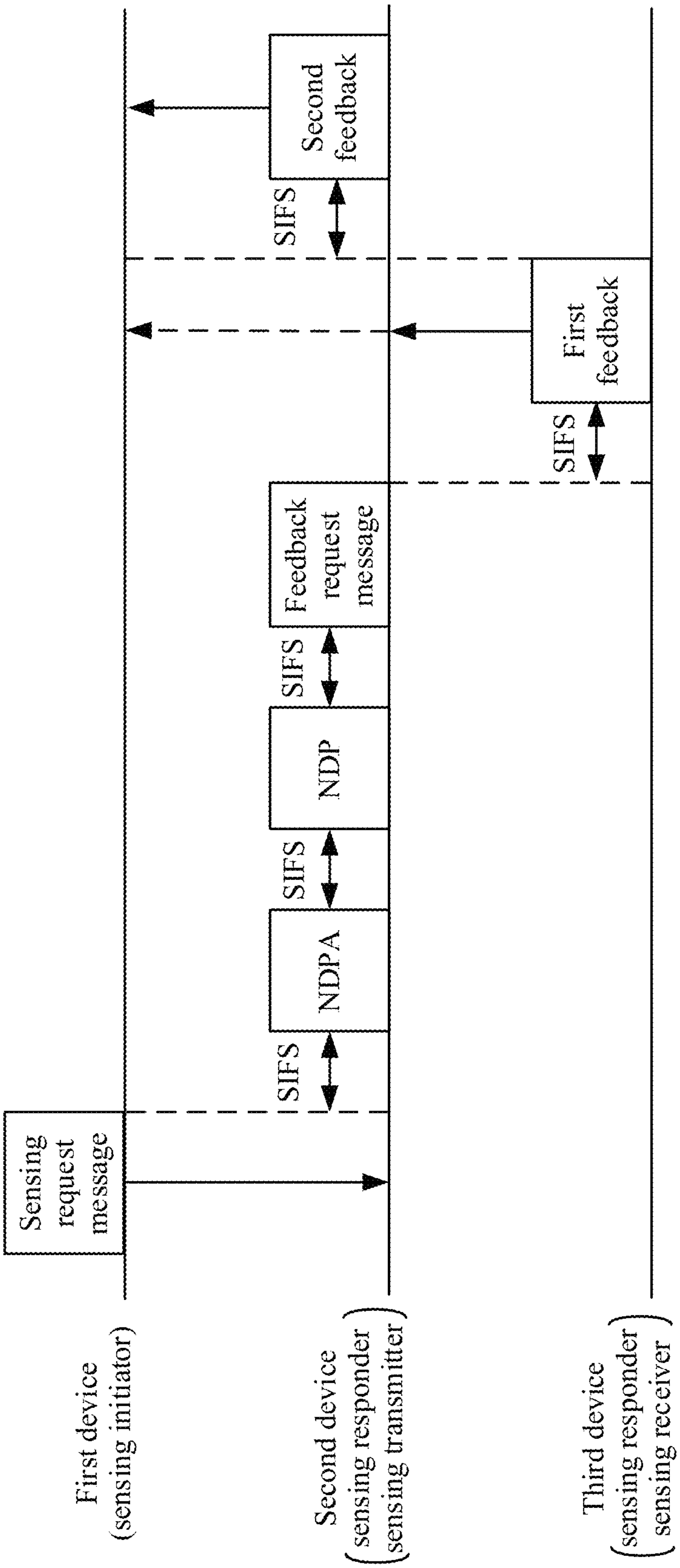
FIG. 13 is a schematic flowchart 1 of a feedback indication method in a scenario B according to an embodiment of this application.

For example, FIG. 12 is a schematic diagram of an architecture of a scenario B, and FIG. 13 is a schematic flowchart 1 of the feedback indication method in the scenario B. As shown in FIG. 12 and FIG. 13, devices for performing the method may include a first device, a second device, and a third device. The second device is connected to the first device and the third device, and for example, the third device may be connected to the first device. The first device may be a sensing initiator, the second device may be a sensing responder of a sensing transmitter, the third device may be a sensing responder of a sensing receiver, and both the second device and the third device may be one or more. In this way, the feedback indication method may include two levels of feedbacks. One level of feedback is a first feedback sent by the third device to the first device or the second device, and the other level of feedback is a second feedback sent by the second device to the first device. In this case, there may be three determining manners (determining manners 4 to 6). Determining manner 4: The first device determines a feedback type of the first feedback and a feedback type of the second feedback. Determining manner 5: The first device determines a feedback type of the first feedback, and the second device determines a feedback type of the second feedback. Determining manner 6: The first device determines a feedback type of the second feedback, and the second device determines a feedback type of the first feedback. The following describes in detail procedures respectively corresponding to the foregoing determining manners 4 to 6.

Determining Manner 4

Figure 14:
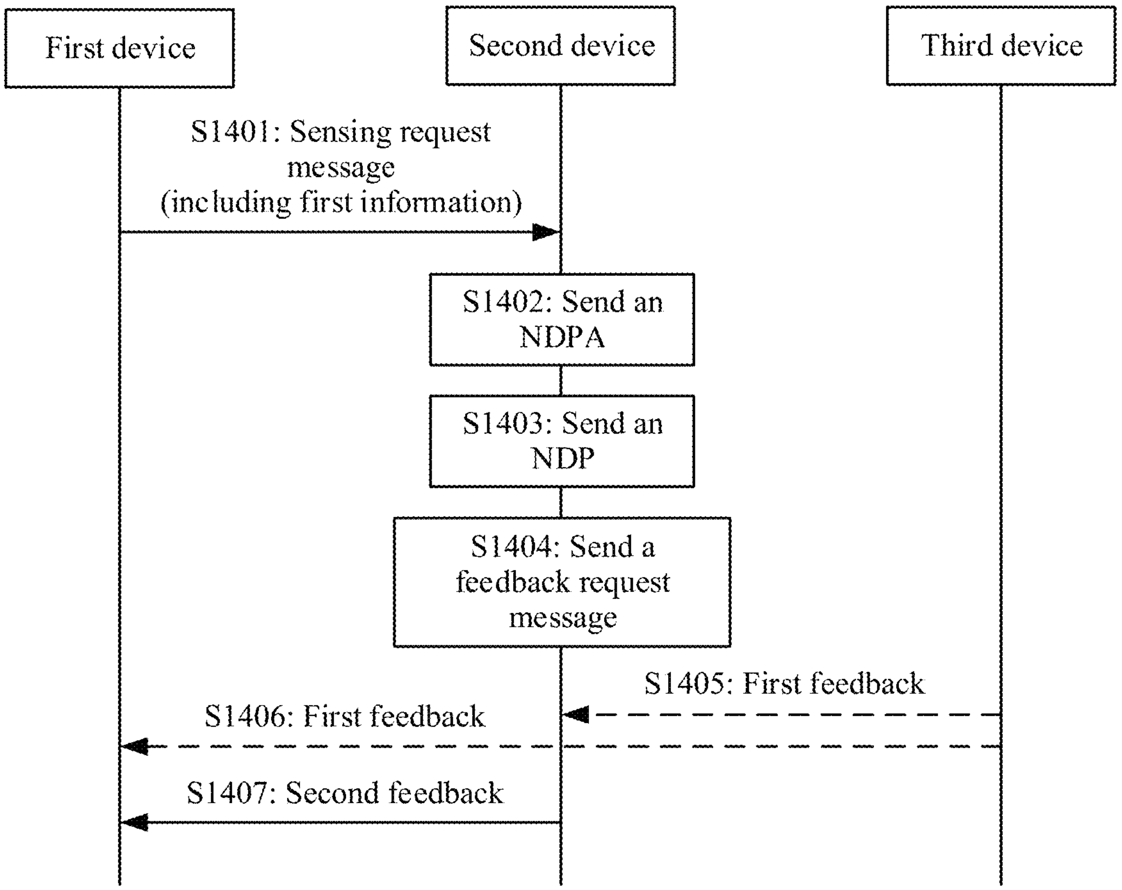
FIG. 14 is a schematic flowchart 2 of a feedback indication method in a scenario B according to an embodiment of this application.

FIG. 14 is a schematic flowchart 2 of the feedback indication method in the scenario B. As shown in FIG. 14, a sensing measurement phase and a sensing reporting phase are used as an example. The feedback indication method may include the following operations.

S1401: A first device sends a sensing request message to a second device, and the second device receives the sensing request message from the first device.

The sensing request message may include the foregoing first information. The first information may include a first field and a second field. The first field may indicate the feedback type of the first feedback, for example, CSI. The second field may indicate the feedback type of the second feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S1402: The second device sends an NDPA.

As shown in FIG. 13, after receiving a sensing request message, the second device may send an NDPA after one SIFS based on the sensing request message. In an embodiment, refer to the related description in S202. Details are not described herein again.

S1403: The second device sends an NDP.

As shown in FIG. 13, after sending the NDPA, the second device may send an NDP after one SIFS.

S1404: The second device sends a feedback request message.

As shown in FIG. 13, after sending the NDP, the second device may send a feedback request message after one SIFS. In an embodiment of the feedback request message, refer to the related description in S205.

S1405: A third device sends the first feedback to the second device, and the third device receives the first feedback from the second device.

S1406: The third device sends the first feedback to the first device, and the third device receives the first feedback from the first device.

The first device may determine the first feedback, for example, the CSI, based on the feedback type indicated by the first field.

In addition, S1405 and S1406 are optional operations. In an embodiment, as shown in FIG. 13, in one aspect, if the third device is not directly connected to the first device, the third device may send the first feedback to the second device. For example, after receiving the NDP, the third device sends the first feedback after one SIFS, that is, S1405 is performed. Alternatively, in another aspect, if the third device is directly connected to the first device, the third device may send the first feedback to the first device, that is, S1406 is performed.

S1407: The second device sends the second feedback to the first device, and the first device receives the second feedback from the second device.

As shown in FIG. 13, the second device may determine the second feedback, namely, a sensing measurement result, based on the feedback type indicated by the second field, for example, the sensing measurement result, and the first feedback, for example, the CSI. In an embodiment, refer to the related description in the foregoing second application scenario. Details are not described herein again. In this way, after receiving the first feedback, the second device may send the second feedback after one SIFS.

Determining Manner 5

Figure 15:
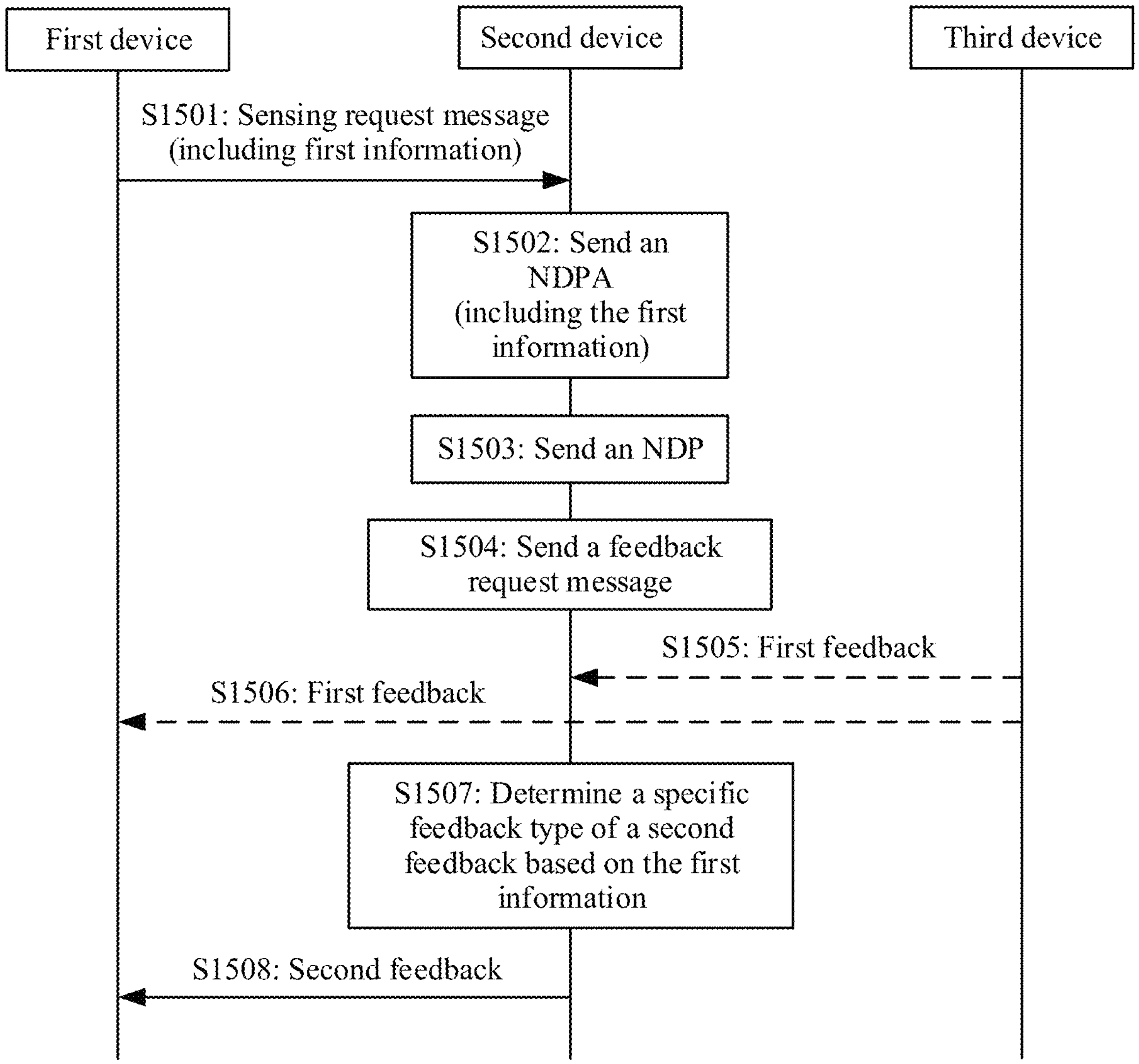
FIG. 15 is a schematic flowchart 3 of a feedback indication method in a scenario B according to an embodiment of this application.

FIG. 15 is a schematic flowchart 3 of the feedback indication method in the scenario B. As shown in FIG. 15, a sensing measurement phase and a sensing reporting phase are used as an example. The feedback indication method may include the following operations.

S1501: A first device sends a sensing request message to a second device, and the second device receives the sensing request message from the first device.

The sensing request message may include a first field and a second field in the foregoing first information. The first field may indicate the feedback type of the first feedback, for example, CSI. The second field may indicate that a feedback type of the second feedback is determined by the second device. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S1502: The second device sends an NDPA.

S1503: The second device sends an NDP.

S1504: The second device sends a feedback request message.

The first information (including the first field and the second field), or only the first field in the first information is carried in the NDPA sent by the second device, to indicate the feedback type of the first feedback, but is not limited, for example, may be alternatively carried in the NDP and the feedback request message sent by the second device.

In addition, in an embodiment of S1502 to S1504, refer to the related descriptions in S202, S205, and S1402 to S1404. Details are not described herein again.

S1505: A third device sends the first feedback to the second device, and the third device receives the first feedback from the second device.

S1506: The third device sends the first feedback to the first device, and the third device receives the first feedback from the first device.

The first device may determine the first feedback, for example, the CSI, based on the feedback type indicated by the first field.

In addition, S1505 and S1506 are optional operations. In an embodiment, refer to the related descriptions in S1405 and S1406. Details are not described herein again.

S1507: The second device determines the feedback type of the second feedback based on the first information.

The second device may determine the feedback type of the second feedback, for example, a sensing measurement result, based on the second field in the first information. In an embodiment, refer to the related description in the foregoing second application scenario. Details are not described herein again. In this way, the second device may determine the second feedback, namely, the sensing measurement result, based on the received first feedback, for example, CSI, and the feedback type of the second feedback.

It should be noted that an execution sequence between S1507 and S1502 to S1506 is not limited.

S1508: The second device sends the second feedback to the first device, and the first device receives the second feedback from the second device.

In an embodiment of S1508, refer to the related description in S1407. Details are not described herein again.

Determining Manner 6

Figure 16:
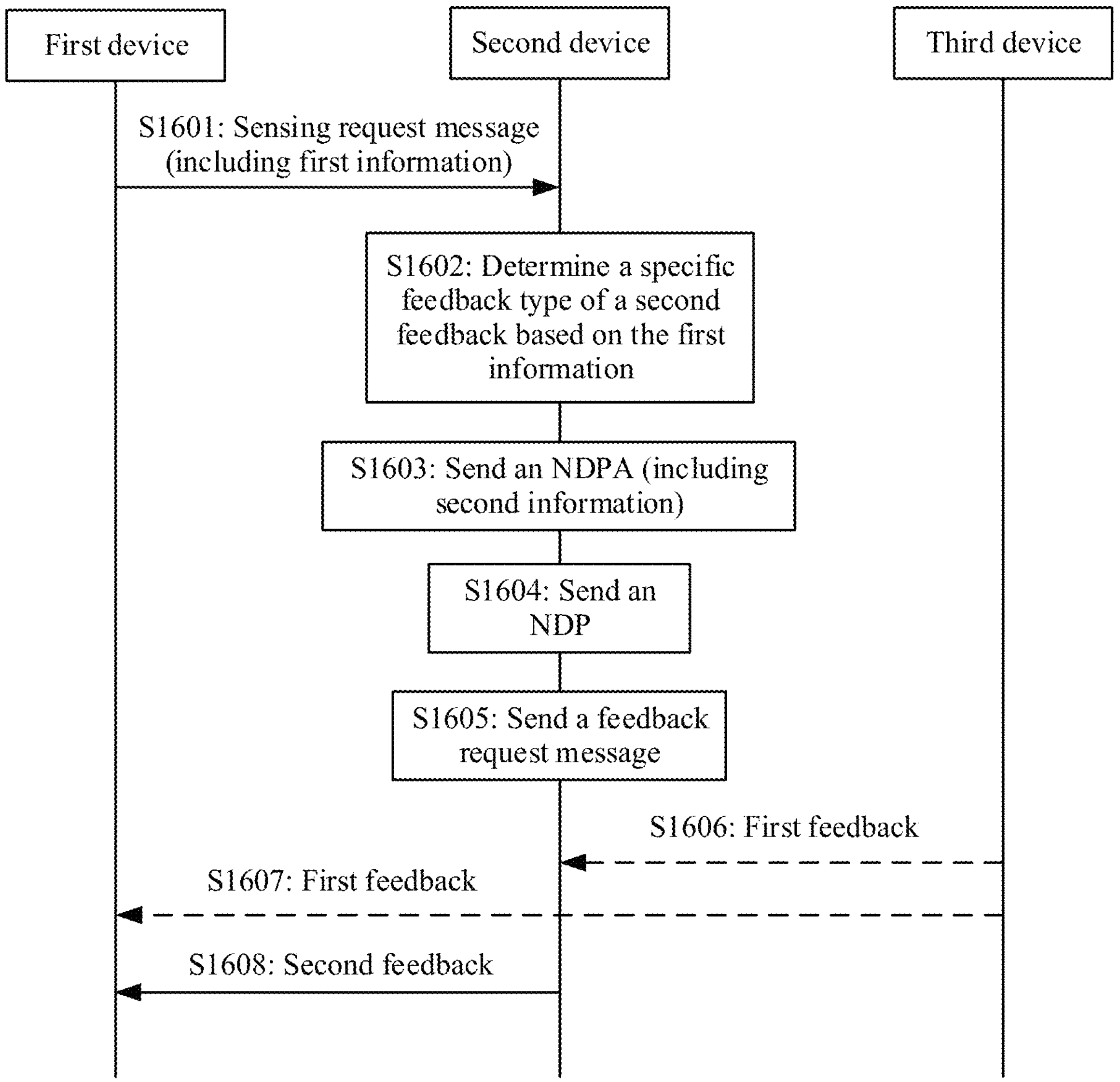
FIG. 16 is a schematic flowchart 4 of a feedback indication method in a scenario B according to an embodiment of this application.

FIG. 16 is a schematic flowchart 4 of the feedback indication method in the scenario B. As shown in FIG. 16, a sensing measurement phase and a sensing reporting phase are used as an example. The feedback indication method may include the following operations.

S1601: A first device sends a sensing request message to a second device, and the second device receives the sensing request message from the first device.

The sensing request message may include a first field and a second field in the foregoing first information. The first field may indicate that a feedback type of the first feedback is determined by the second device, and the second field may indicate the feedback type of the second feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S1602: The second device determines the feedback type of the first feedback based on the first information.

After receiving the sensing request message, the second device may determine the feedback type of the first feedback, for example, CSI, based on the first field in the first information. In an embodiment, refer to the related description in the foregoing second application scenario. Details are not described herein again.

S1603: The second device sends an NDPA.

S1604: The second device sends an NDP.

S1605: The second device sends a feedback request message.

The second information may be carried in the NDPA sent by the second device, to indicate the feedback type of the first feedback, but is not limited. For example, the second information may be carried in the NDP and the feedback request message sent by the second device. In other words, S1602 is performed before S1605.

In addition, in an embodiment of S1603 to S1605, refer to the related descriptions in S202, S205, and S1402 to S1404. Details are not described herein again.

S1606: A third device sends the first feedback to the second device, and the third device receives the first feedback from the second device.

S1607: The third device sends the first feedback to the first device, and the third device receives the first feedback from the first device.

The first device may determine the first feedback, for example, the CSI, based on the feedback type indicated by the first field. In an embodiment, refer to the related description in the foregoing second application scenario. Details are not described herein again.

In addition, S1606 and S1607 are optional operations. In an embodiment, refer to the related descriptions in S1405 and S1406. Details are not described herein again.

S1608: The second device sends the second feedback to the first device, and the first device receives the second feedback from the second device.

In an embodiment of S1608, refer to the related description in S1407. Details are not described herein again.

It should be understood that, in the foregoing scenario B, in addition to the foregoing determining manners 4 to 6, there may be another determining manner, for example, the second device determines the feedback type of the first feedback and the feedback type of the second feedback, and the second device determines the feedback type of the first feedback and the third device determines the feedback type of the second feedback. In an embodiment, refer to the related descriptions in the foregoing determining manners 4 to 6. Details are not described herein again.

Scenario C

Figure 17:
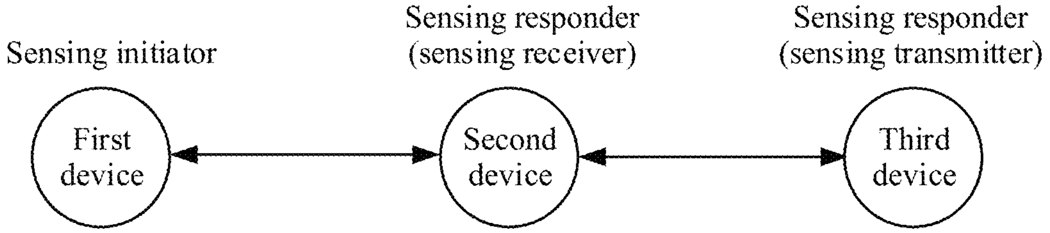
FIG. 17 is a schematic diagram of an architecture of a scenario C.
Figure 18:
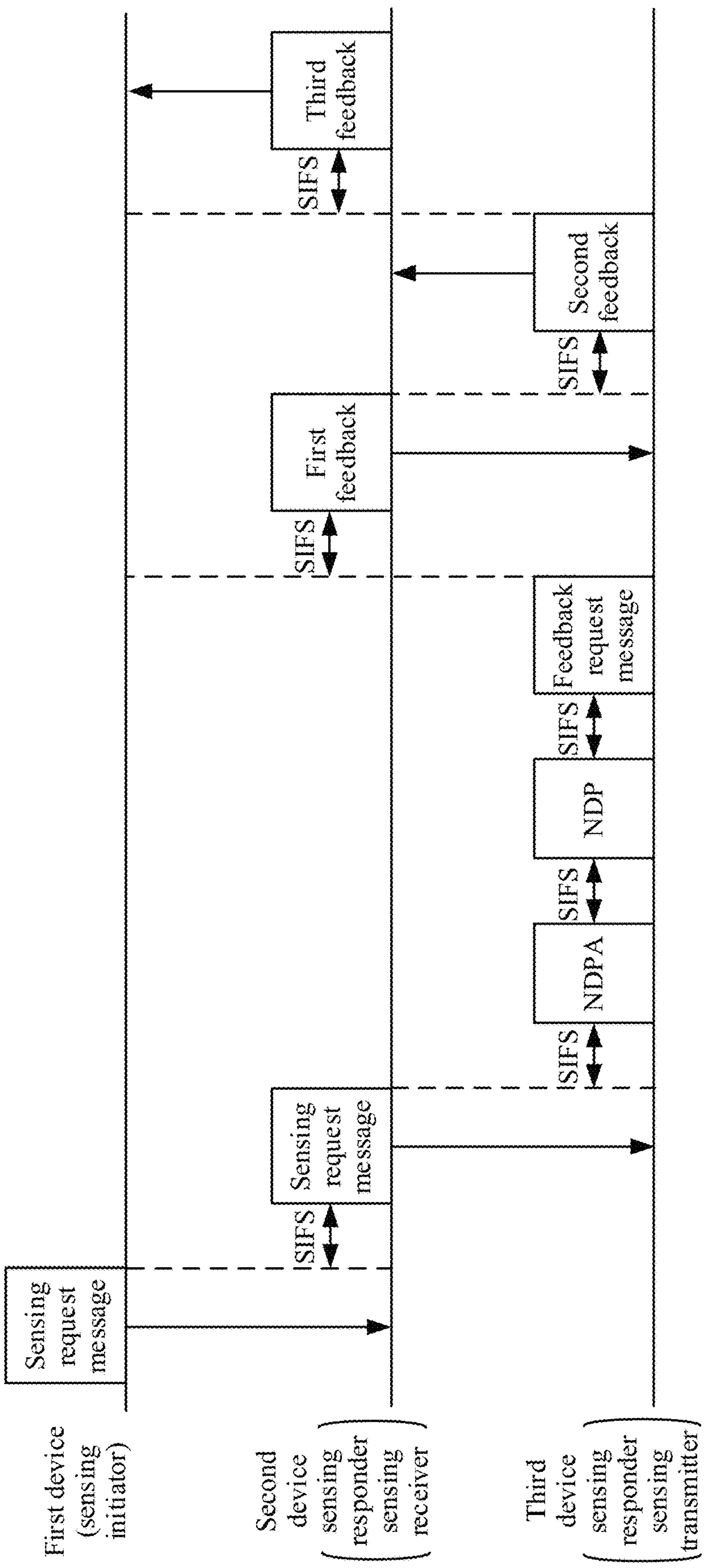
FIG. 18 is a schematic flowchart 1 of a feedback indication method in a scenario C according to an embodiment of this application.

For example, FIG. 17 is a schematic diagram of an architecture of a scenario C, and FIG. 18 is a schematic flowchart 1 of the feedback indication method in the scenario C. As shown in FIG. 17 and FIG. 18, devices for performing the method may include a first device, a second device, and a third device. The second device is connected to the first device and the third device. The first device may be a sensing initiator, the second device may be a sensing responder of a sensing receiver, the third device may be a sensing responder of a sensing transmitter, and both the second device and the third device may be one or more. In this way, the feedback indication method may include three levels of feedback. A first level of feedback is a first feedback sent by the second device to the third device, a second level of feedback is a second feedback sent by the third device to the second device, and a third level of feedback is a third feedback sent by the second device to the first device. In this case, there may be four determining manners (determining manners 7 to 10). Determining manner 7: The first device determines a feedback type of the first feedback, a feedback type of the second feedback, and a feedback type of the third feedback. Determining manner 8: The first device determines a feedback type of the first feedback and a feedback type of the second feedback, and the second device determines a feedback type of the third feedback. Determining manner 9: The first device determines a feedback type of the first feedback and a feedback type of the third feedback, and the second device determines a feedback type of the second feedback. Determining manner 10: The first device determines a feedback type of the second feedback and a feedback type of the third feedback, and the third device determines a feedback type of the first feedback. The following describes in detail procedures respectively corresponding to the foregoing determining manners 7 to 10.

Determining Manner 7

Figure 19:
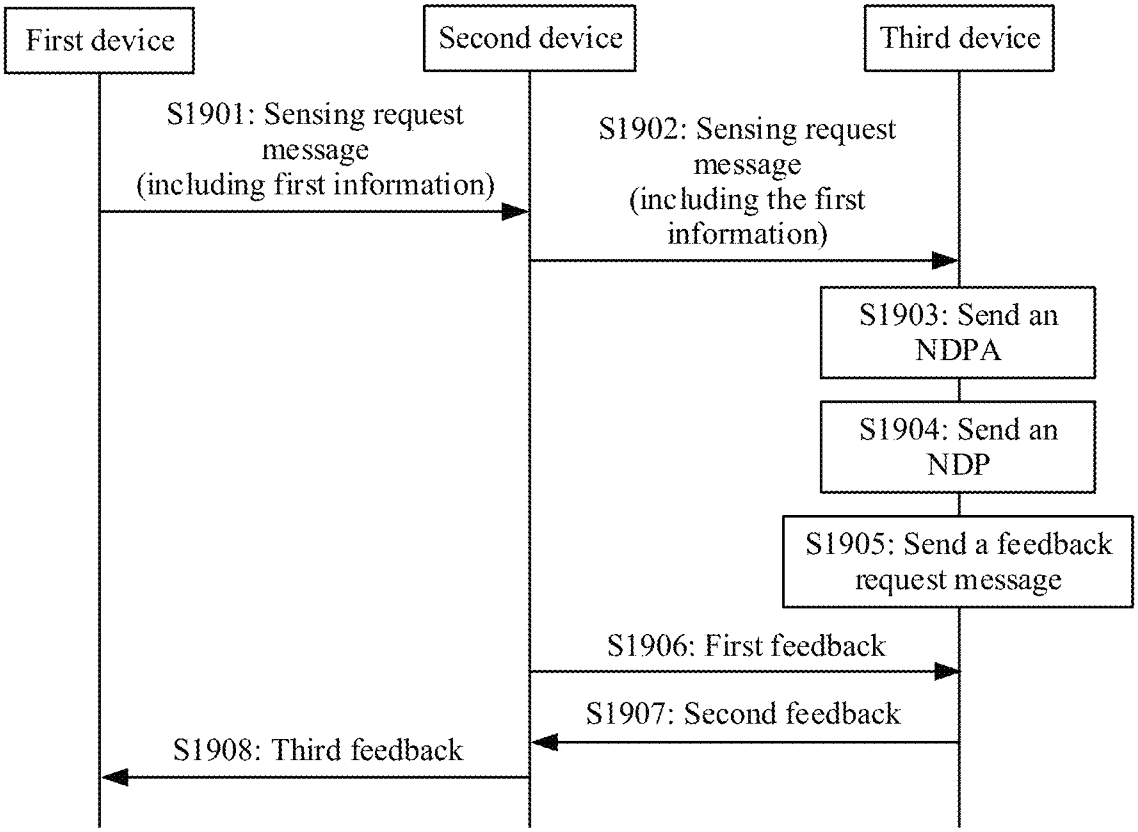
FIG. 19 is a schematic flowchart 2 of a feedback indication method in a scenario C according to an embodiment of this application.

FIG. 19 is a schematic flowchart 2 of the feedback indication method in the scenario C. As shown in FIG. 19, a sensing measurement phase and a sensing reporting phase are used as an example. The feedback indication method may include the following operations.

S1901: A first device sends a sensing request message to a second device, and the second device receives the sensing request message from the first device.

The sensing request message may include the foregoing first information. The first information may include a first field, a second field, and a third field. The first field may indicate the feedback type of the first feedback, for example, uncompressed CSI. The second field may indicate the feedback type of the second feedback, for example, compressed CSI. The third field may indicate the feedback type of the third feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S1902: The second device sends the sensing request message to a third device, and the third device receives the sensing request message from the second device.

As shown in FIG. 18, because the second device is the sensing receiver, and the third device is the sensing transmitter, the second device needs to forward a sensing request message to the third device. For example, after receiving the sensing request message, the second device sends the sensing request message after one SIFS. The sensing request message forwarded by the second device may include the first field, the second field, and the third field in the first information, or may include only the second field. This is not limited.

S1903: The third device sends an NDPA.

As shown in FIG. 18, after receiving the sensing request message, the third device may send an NDPA after one SIFS based on the sensing request message. In an embodiment, refer to the related description in S202. Details are not described herein again.

S1904: The third device sends an NDP.

As shown in FIG. 18, after sending the NDPA, the third device may send an NDP after one SIFS.

S1905: The third device sends a feedback request message.

As shown in FIG. 18, after sending the NDP, the third device may send a feedback request message after one SIFS. In an embodiment of the feedback request message, refer to the related description in S205.

S1906: The second device sends the first feedback to the third device, and the third device receives the first feedback from the second device.

As shown in FIG. 18, the third device may determine the first feedback, for example, uncompressed CSI, based on the feedback type indicated by the first field. In an embodiment, refer to the related description in the foregoing second application scenario. Details are not described herein again. In this way, after receiving the feedback request message, the third device may send the first feedback after one SIFS.

S1907: The third device sends the second feedback to the second device, and the second device receives the second feedback from the third device.

As shown in FIG. 18, the second device may determine the second feedback, namely, compressed CSI, based on the feedback type indicated by the second field, for example, the compressed CSI, and the first feedback, for example, the uncompressed CSI. In an embodiment, refer to the related description in the foregoing second application scenario. Details are not described herein again. In this way, after receiving the first feedback, the second device may send the second feedback to the second device after one SIFS.

S1908: The second device sends the third feedback to the first device, and the first device receives the third feedback from the second device.

As shown in FIG. 18, the second device may determine the third feedback, namely, a sensing measurement result, based on the feedback type indicated by the foregoing third field, for example, the sensing measurement result, and the second feedback, for example, the compressed CSI, to send the third feedback after receiving the second feedback after one SIFS.

Determining Manner 8

Figure 20:
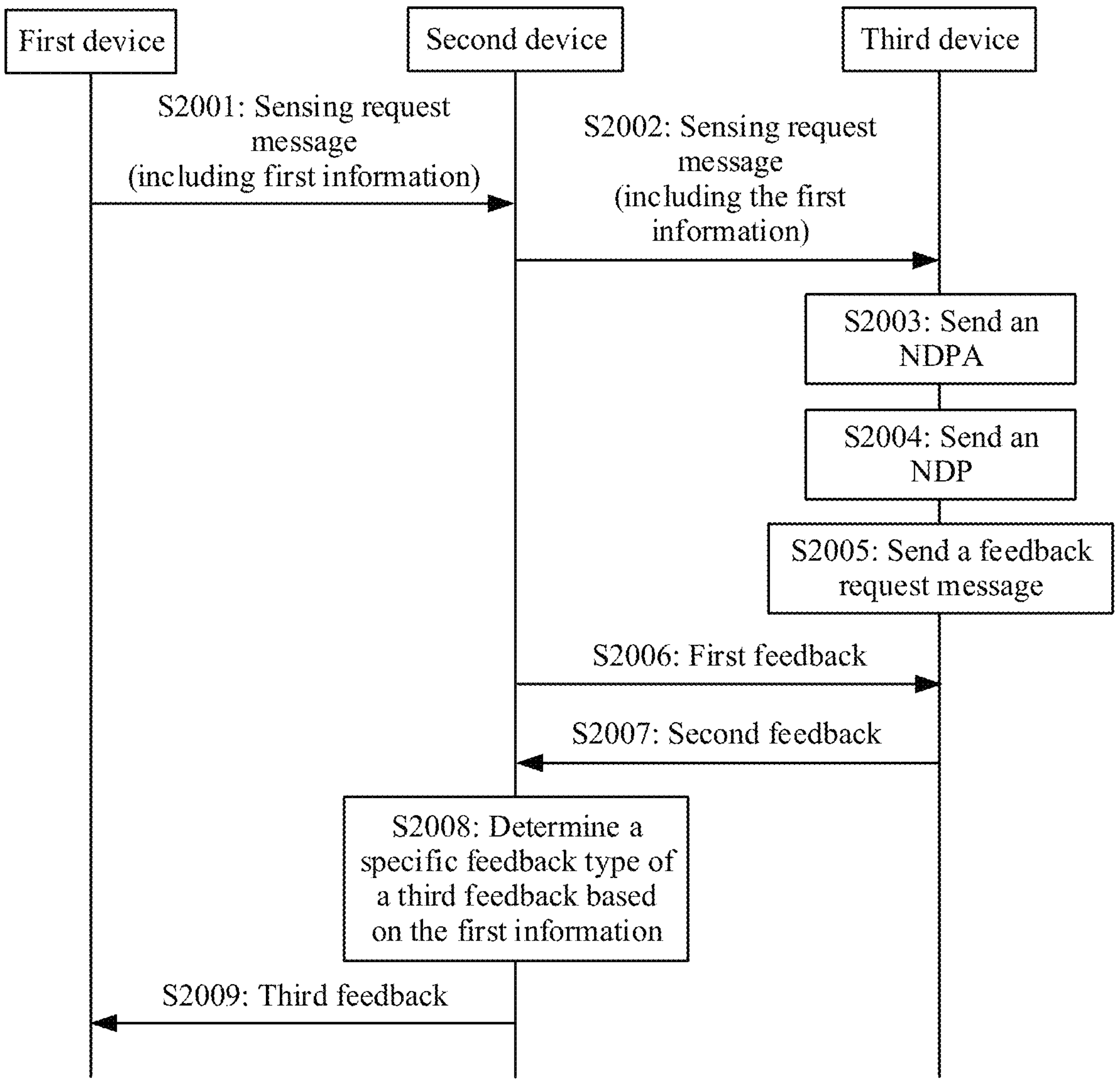
FIG. 20 is a schematic flowchart 3 of a feedback indication method in a scenario C according to an embodiment of this application.

FIG. 20 is a schematic flowchart 3 of the feedback indication method in the scenario C. As shown in FIG. 20, a sensing measurement phase and a sensing reporting phase are used as an example. The feedback indication method may include the following operations.

S2001: A first device sends a sensing request message to a second device, and the second device receives the sensing request message from the first device.

The sensing request message may include a first field and a second field in the foregoing first information, and further include a third field. The first field may indicate the feedback type of the first feedback, for example, uncompressed CSI. The second field may indicate the feedback type of the second feedback, for example, compressed CSI. The third field may indicate that a feedback type of the third feedback is determined by the second device. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S2002: The second device sends the sensing request message to a third device, and the third device receives the sensing request message from the second device.

In an embodiment of S2002, refer to the related description in S1902. Details are not described herein again.

S2003: The third device sends an NDPA.

S2004: The third device sends an NDP.

S2005: The third device sends a feedback request message.

S2006: The second device sends the first feedback to the third device, and the third device receives the first feedback from the second device.

S2007: The third device sends the second feedback to the second device, and the second device receives the second feedback from the third device.

In an embodiment of S2003 to S2007, refer to the related descriptions in S1903 to S1907. Details are not described herein again.

S2008: The second device determines the feedback type of the third feedback based on the first information.

The second device may determine the feedback type of the third feedback, for example, a sensing measurement result, based on the third field in the first information. In an embodiment, refer to the related description in the foregoing second application scenario. Details are not described herein again. In this way, the second device may determine the third feedback, namely, the sensing measurement result, based on the received second feedback, for example, CSI, and the feedback type of the third feedback. In addition, an execution sequence between S2003 to S2007 and S2008 is not limited.

S2009: The second device sends the third feedback to the first device, and the first device receives the third feedback from the second device.

In an embodiment of S2009, refer to the related description in S1908. Details are not described herein again.

Determining Manner 9

Figure 21:
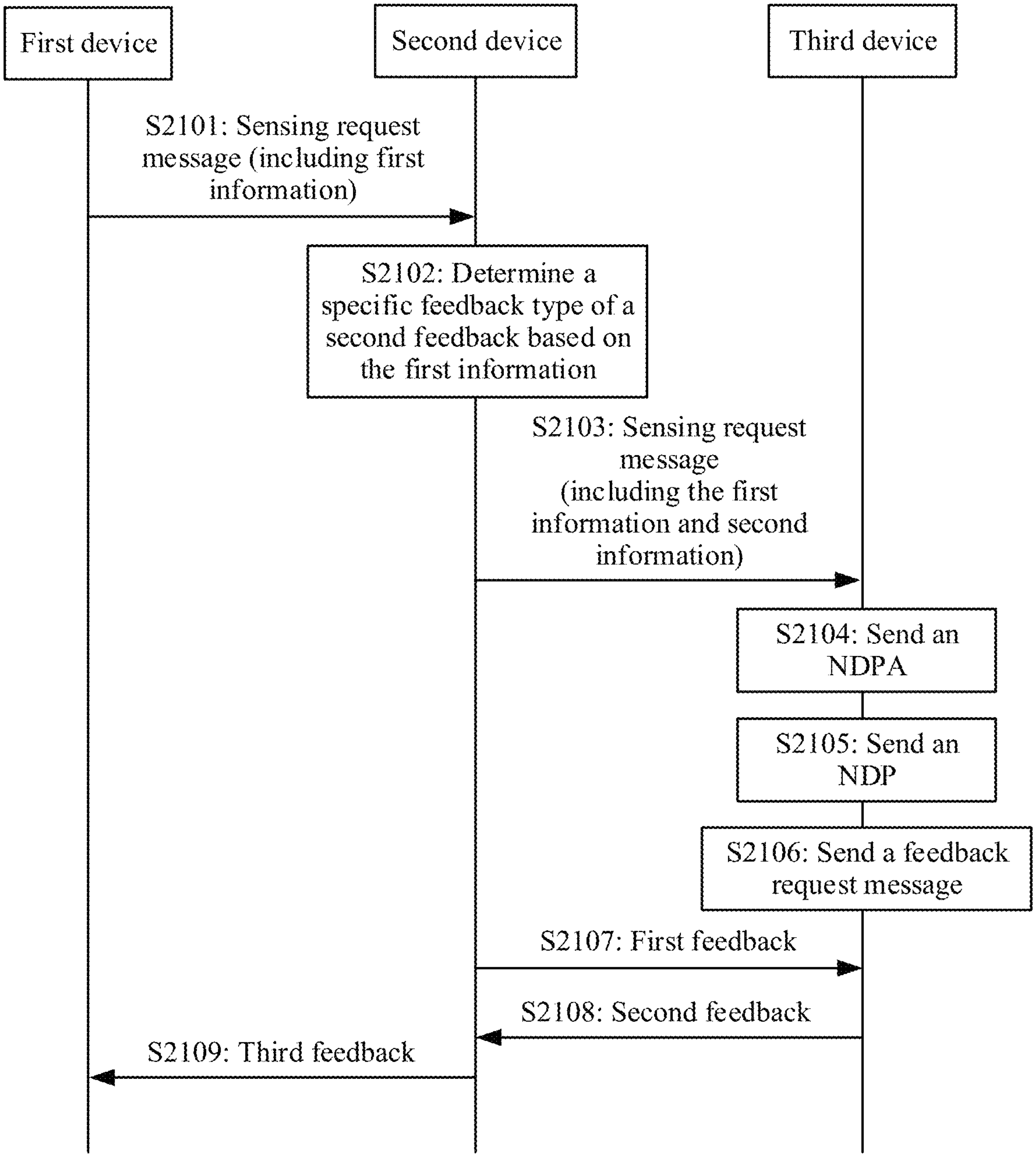
FIG. 21 is a schematic flowchart 4 of a feedback indication method in a scenario C according to an embodiment of this application.

FIG. 21 is a schematic flowchart 4 of the feedback indication method in the scenario C. As shown in FIG. 21, a sensing measurement phase and a sensing reporting phase are used as an example. The feedback indication method may include the following operations.

S2101: A first device sends a sensing request message to a second device, and the second device receives the sensing request message from the first device.

The sensing request message may include a first field and a second field in the foregoing first information, and further include a third field. The first field may indicate the feedback type of the first feedback, for example, uncompressed CSI. The second field may indicate that a feedback type of the second feedback is determined by the second device. The third field may indicate the feedback type of the third feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S2102: The second device determines the feedback type of the second feedback based on the first information.

After receiving the sensing request message, the second device may determine, based on the second field in the first information, the feedback type of the second feedback, for example, compressed CSI. In an embodiment, refer to the related description in the foregoing second application scenario. Details are not described herein again. In this way, the second device may generate second information, to indicate to determine the feedback type of the second feedback.

S2103: The second device sends the sensing request message to a third device, and the third device receives the sensing request message from the second device.

As shown in FIG. 18, because the second device is the sensing receiver, and the third device is the sensing transmitter, the second device needs to forward a sensing request message to the third device. For example, after receiving the sensing request message, the second device sends the sensing request message after one SIFS. The sensing request message forwarded by the second device may include the second information, or may include only any one of the following in the first information: the first field, the second field, and the third field, the first field and the second field, or the second field. This is not limited.

S2104: The third device sends an NDPA.

S2105: The third device sends an NDP.

S2106: The third device sends a feedback request message.

S2107: The second device sends the first feedback to the third device, and the third device receives the first feedback from the second device.

It should be understood that the second information may alternatively be carried in the first feedback sent by the second device to the third device. This is not limited. In other words, S2102 is performed before S2107.

S2108: The third device sends the second feedback to the second device, and the second device receives the second feedback from the third device.

S2109: The second device sends the third feedback to the first device, and the first device receives the third feedback from the second device.

In an embodiment of S2104 to S2109, refer to the related descriptions in S1903 to S1908. Details are not described herein again.

Determining Manner 10

Figure 22:
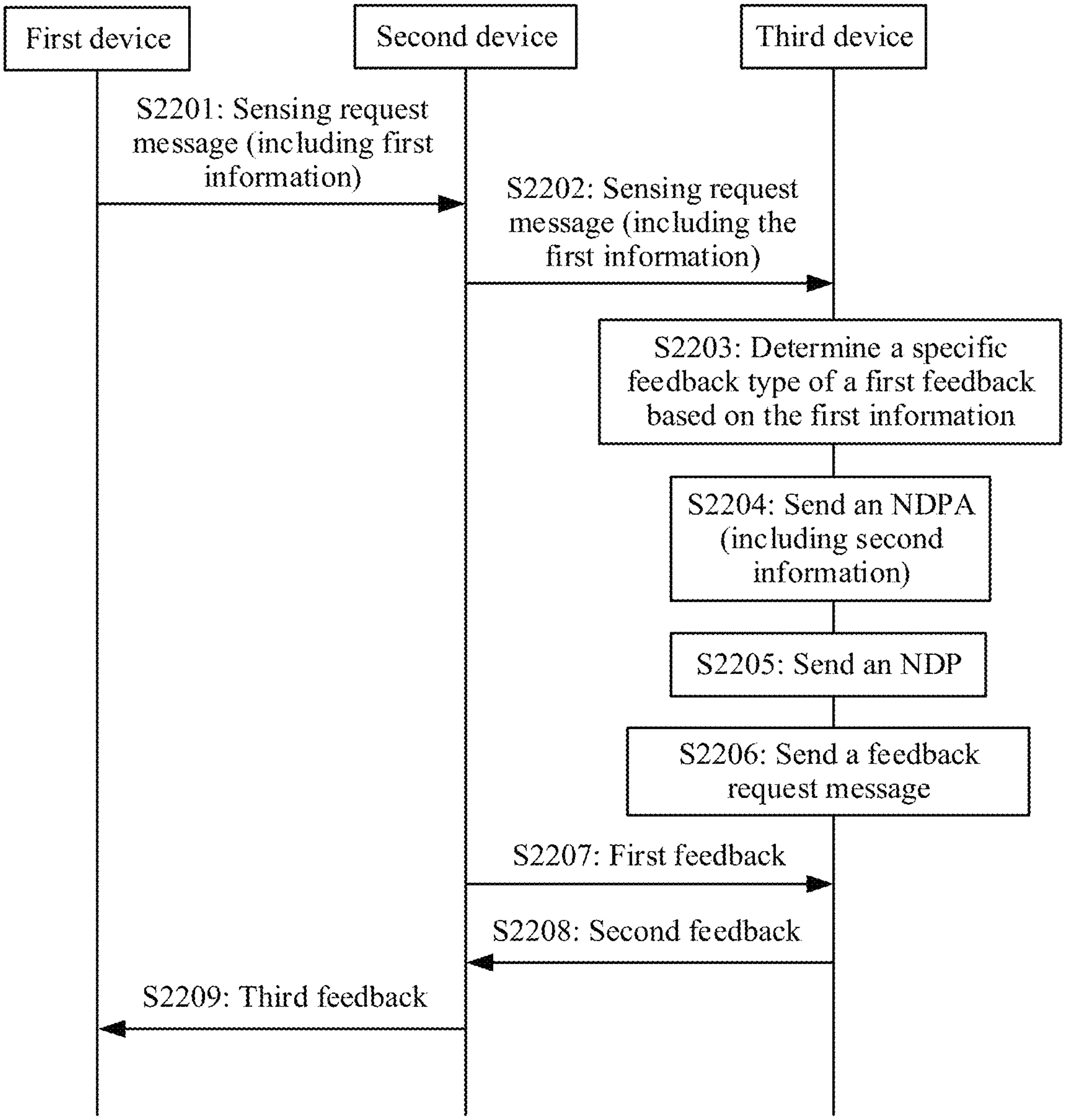
FIG. 22 is a schematic flowchart 5 of a feedback indication method in a scenario C according to an embodiment of this application.

FIG. 22 is a schematic flowchart 5 of the feedback indication method in the scenario C. As shown in FIG. 22, a sensing measurement phase and a sensing reporting phase are used as an example. The feedback indication method may include the following operations.

S2201: A first device sends a sensing request message to a second device, and the second device receives the sensing request message from the first device.

The sensing request message may include a first field and a second field in the foregoing first information, and further include a third field. The first field may indicate that a feedback type of the first feedback is determined by the third device. The second field may indicate the feedback type of the second feedback, for example, compressed CSI. The third field may indicate the feedback type of the third feedback, for example, a sensing measurement result. In an embodiment, refer to the related descriptions in S601 and S602. Details are not described herein again.

In an embodiment, the sensing request message may further include the foregoing mode indication information. In an embodiment, refer to the related description in the foregoing first application scenario. Details are not described herein again.

S2202: The second device sends the sensing request message to a third device, and the third device receives the sensing request message from the second device.

As shown in FIG. 18, because the second device is the sensing receiver, and the third device is the sensing transmitter, the second device needs to forward a sensing request message to the third device. For example, after receiving the sensing request message, the second device sends the sensing request message after one SIFS. The sensing request message forwarded by the second device may include only any one of the following: the first field, the second field, and the third field, or the first field and the second field. This is not limited.

S2203: The third device determines the feedback type of the first feedback based on the first information.

After receiving the sense request message, the third device may determine, based on the first field in the first information, the feedback type of the first feedback, for example, uncompressed CSI. In an embodiment, refer to the related description in the foregoing second application scenario. Details are not described herein again. In this way, the third device may generate second information, to indicate to determine the feedback type of the first feedback.

S2204: The third device sends an NDPA.

S2205: The third device sends an NDP.

S2206: The third device sends a feedback request message.

The second information may be carried in the NDPA sent by the second device, to indicate the feedback type of the first feedback, but is not limited. For example, the second information may be carried in the NDP and the feedback request message sent by the third device. In other words, S2203 is performed before S2206.

S2207: The second device sends the first feedback to the third device, and the third device receives the first feedback from the second device.

S2208: The third device sends the second feedback to the second device, and the second device receives the second feedback from the third device.

S2209: The second device sends the third feedback to the first device, and the first device receives the third feedback from the second device.

In an embodiment of S2204 to S2209, refer to the related descriptions in S1903 to S1908. Details are not described herein again.

It should be understood that, in the foregoing scenario C, in addition to the foregoing determining manners 7 to 10, there may be another determining manner, for example, the second device determines the feedback type of the first feedback, the feedback type of the second feedback, and the feedback type of the third feedback, and the second device determines the feedback type of the first feedback, and the third device determines the feedback type of the second feedback and the feedback type of the third feedback. In an embodiment, refer to the related descriptions in the foregoing determining manners 7 to 10. Details are not described herein again.

It can be learned from the methods shown in FIG. 6 to FIG. 22 that, in a scenario of a plurality of devices and a plurality of interactions, the first information indicates feedback types of a plurality of feedbacks at different levels, for example, the feedback type of the first feedback and/or the feedback type of the second feedback. This can more comprehensively and accurately indicate a feedback type, thereby improving applicability of a sensing technology in the scenario of a plurality of devices and a plurality of interactions.

Embodiment 2

Figure 23:
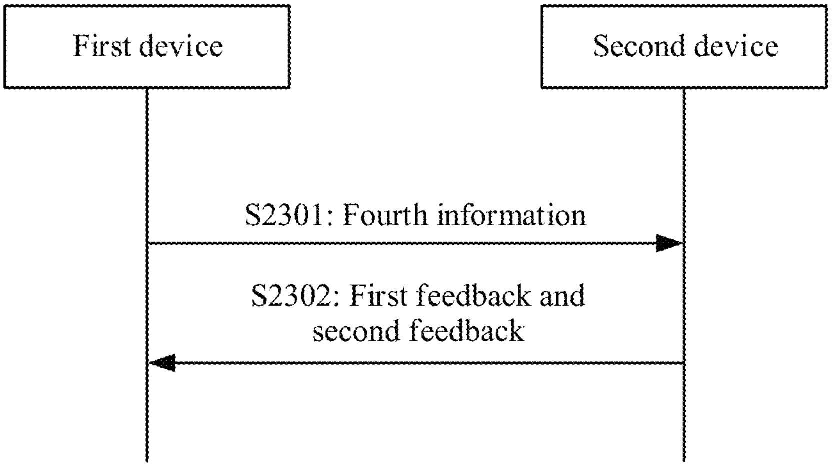
FIG. 23 is a schematic flowchart 2 of a feedback indication method according to an embodiment of this application.

For example, FIG. 23 is a schematic flowchart 2 of the feedback indication method according to an embodiment of this application. The feedback indication method is applicable to communication between two of the three devices shown in FIG. 5, for example, communication between the first device and the second device in the first device, the second device, and the third device. The first device may be a sensing initiator, the second device may be a sensing responder of a sensing transmitter, and the third device may be a sensing responder of a sensing receiver.

As shown in FIG. 23, the feedback indication method may include the following operations.

S2301: The first device sends fourth information, and the second device receives the fourth information.

The fourth information may indicate that the first device needs to obtain all feedback or a part of feedbacks, for example, a first feedback and/or a second feedback. In an embodiment of the first feedback and the second feedback, refer to the foregoing first embodiment. Details are not described herein again.

In an embodiment, the fourth information may include a plurality of bits, for example, 2 bits or 3 bits. In this way, the fourth information may indicate, based on an index including the plurality of bits or a bitmap of the plurality of bits, that the first device needs to obtain the first feedback and/or the second feedback, which is separately described below.

a. Index Indication

A plurality of bits may form different indexes, and the different indexes may indicate that the first device needs to obtain the first feedback and/or the second feedback. For example, it is shown in Table 7 below.

TABLE 7

| Index | Feedback required to be obtained |
|---|---|
| 00 | Need to obtain a first feedback |
| 01 | Need to obtain a second feedback |
| 11 | Need to obtain a first feedback and a second feedback |

It can be learned from the table 7 that the foregoing index may include 2 bits, and indicate various feedbacks that the first device needs to obtain. In this way, the first device may traverse the table 7, to determine an index corresponding to a feedback that the first device needs to obtain, so as to generate the fourth information carrying the index, to indicate that the first device needs to obtain the feedback. For example, if the first device needs to obtain the first feedback, the first device traverses the table 7, to generate the fourth information carrying the index 00, so as to indicate that the first device needs to obtain the first feedback. For another example, if the first device needs to obtain the second feedback, the first device traverses the table 7, to generate the fourth information carrying the index 01, so as to indicate that the first device needs to obtain the second feedback. For still another example, if the first device needs to obtain the first feedback and the second feedback, the first device traverses the table 7, to generate the fourth information carrying the index 11, so as to indicate that the first device needs to obtain the first feedback and the second feedback.

b. Bitmap Indication

The fourth information may include a plurality of bits, and each bit may indicate whether the first device needs to obtain a corresponding feedback. For example, it is shown in Table 8 below.

TABLE 8

| Bitmap | Feedback required to be obtained |
|---|---|
| 10 | Need to obtain a first feedback |
| 01 | Need to obtain a second feedback |
| 11 | Need to obtain a first feedback and a second feedback |

It can be learned from the table 8 that the bitmap in the table 8 may include 2 bits. In an order from left to right, each of the 2 bits may indicate whether the first device needs to obtain a corresponding feedback. For example, a first bit may indicate whether the first device needs to obtain the first feedback. If the first bit is 1, it indicates that the first device needs to obtain the first feedback, and if the first bit is 0, it indicates that the first device does not need to obtain the first feedback. A second bit may indicate whether the first device needs to obtain the second feedback. If the second bit is 1, it indicates that the first device needs to obtain the second feedback, and if the second bit is 0, it indicates that the first device does not need to obtain the second feedback. In this way, if both the first bit and the second bit are 1, it indicates that the first device needs to obtain the first feedback and the second feedback.

Further, the fourth information may be carried in one or more of the following: signaling in a sensing setup phase such as a sensing setup request message and a sensing setup reception message or signaling in a sensing measurement phase such as a sensing request message, to reuse signaling, so as to reduce communication overheads and improve communication efficiency.

In an embodiment, if the fourth information indicates that the first device needs to obtain the first feedback, the second device may further send the fourth information to the third device (not shown in FIG. 23). In this way, if the third device is directly connected to the first device, the third device may directly send the first feedback to the first device based on the fourth information, so that the first device can obtain the first feedback more quickly, to reduce a communication delay and improve communication efficiency.

S2302. The second device sends the first feedback and/or the second feedback based on the fourth information, and the first device receives the first feedback and/or the second feedback.

After the first device sends a feedback request message, the second device may receive the first feedback from the third device. If the fourth information indicates that the first device needs to obtain a part of feedbacks, for example, the first feedback, the second device may send the first feedback to the first device, that is, forward the first feedback. If the fourth information indicates that the first device needs to obtain a part of feedbacks, for example, the second feedback, the second device may determine the second feedback, for example, a sensing measurement result, based on the first feedback, for example, the CSI, and send the second feedback to the second device. If the fourth information indicates that the first device needs to obtain all feedbacks, for example, the first feedback and the second feedback, the second device may determine the second feedback based on the first feedback, and then send the first feedback and the second feedback to the second device, for example, send the first feedback and the second feedback in a packaged manner or separately.

The foregoing describes in detail an overall procedure of the feedback indication method provided in an embodiment of the application with reference to FIG. 23. The following describes in detail a procedure of the feedback indication method shown in FIG. 23 in the scenario A to the scenario C with reference to FIG. 24 to FIG. 26.

Figure 24:
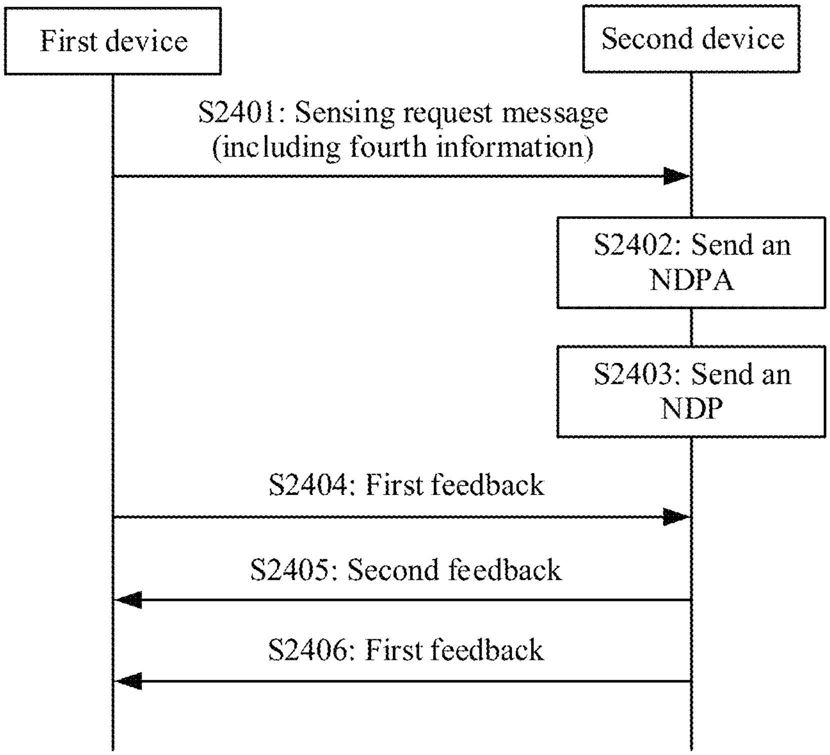
FIG. 24 is a schematic flowchart 5 of a feedback indication method in a scenario A according to an embodiment of this application.

For example, FIG. 24 is a schematic flowchart 5 of the feedback indication method in the scenario A. As shown in FIG. 24, the foregoing determining manner 1, a sensing measurement phase, and a sensing reporting phase are used as an example. The feedback indication method may include the following operations.

S2401: A first device sends a sensing request message to a second device, and the second device receives the sensing request message from the first device.

The sensing request message may further carry the foregoing fourth information. The fourth information may indicate that the first device needs to obtain a first feedback and a second feedback. In an embodiment, refer to the related descriptions in S2301 and S2302. Details are not described herein again.

S2402: The second device sends an NDPA.

S2403: The second device sends an NDP.

S2404: The first device sends the first feedback to the second device, and the second device receives the first feedback from the first device.

S2405: The second device sends the second feedback to the first device, and the first device receives the second feedback from the second device.

In an embodiment of S2401 to S2405, refer to the related descriptions in S901 to S905. Details are not described herein again.

S2406: The second device sends the first feedback to the first device, and the first device receives the first feedback from the second device.

With reference to the related description in S2401, it can be learned that the second device may send the first feedback to the first device based on the fourth information, for example, send the first feedback and the second feedback in a packaged manner. In addition, if the fourth information indicates that the first device needs to obtain the first feedback, the second device may directly forward the first feedback from the second device to the first device based on the fourth information, without generating the second feedback.

Figure 25:
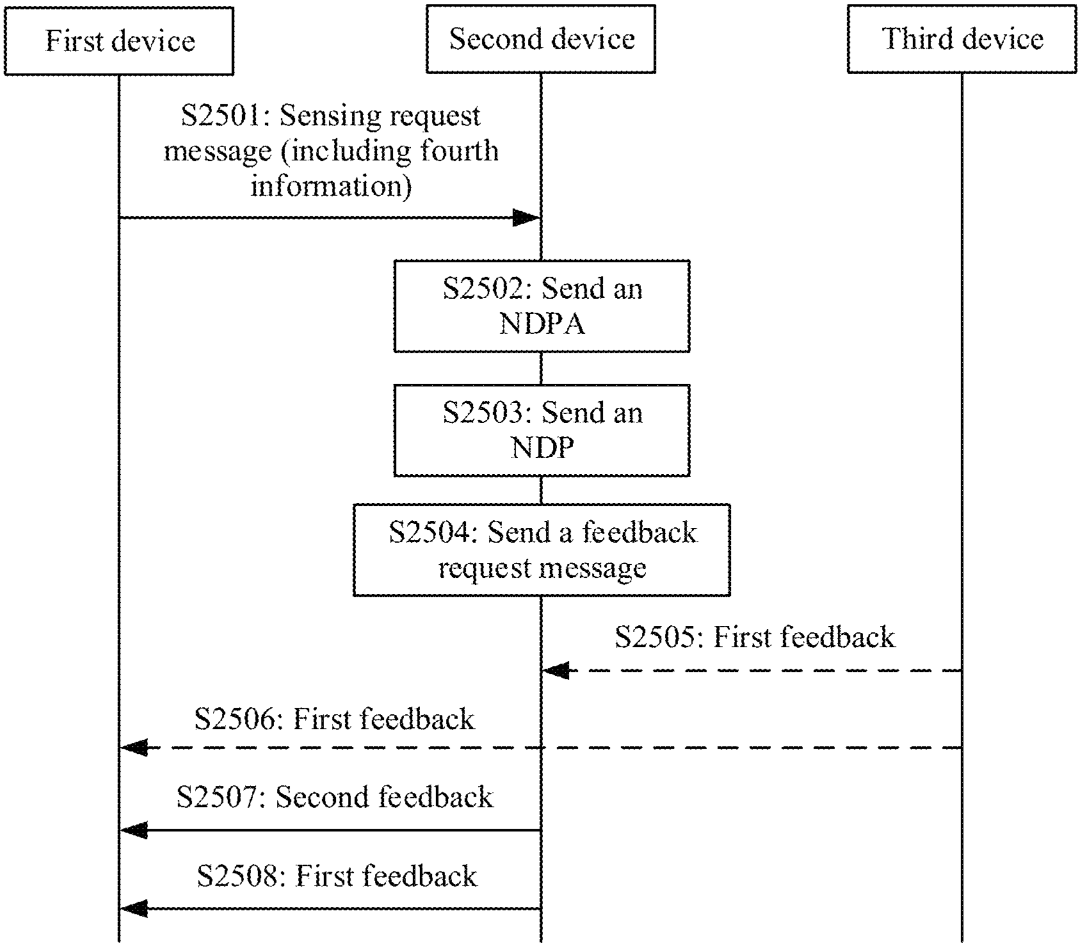
FIG. 25 is a schematic flowchart 5 of a feedback indication method in a scenario B according to an embodiment of this application.

For example, FIG. 25 is a schematic flowchart 5 of the feedback indication method in the scenario B. As shown in FIG. 25, the foregoing determining manner 4, a sensing measurement phase, and a sensing reporting phase are used as an example. The feedback indication method may include the following operations.

S2501: A first device sends a sensing request message to a second device, and the second device receives the sensing request message from the first device.

The sensing request message may further carry the foregoing fourth information. The fourth information may indicate that the first device needs to obtain a first feedback and a second feedback. In an embodiment, refer to the related descriptions in S2301 and S2302. Details are not described herein again.

S2502: The second device sends an NDPA.

S2503: The second device sends an NDP.

S2504: The second device sends a feedback request message.

S2505: A third device sends the first feedback to the second device, and the third device receives the first feedback from the second device.

S2506: The third device sends the first feedback to the first device, and the third device receives the first feedback from the first device.

S2507: The second device sends the second feedback to the first device, and the first device receives the second feedback from the second device.

In an embodiment of S2501 to S2507, refer to the related descriptions in S1401 to S1407. Details are not described herein again.

S2508: The second device sends the first feedback to the first device, and the first device receives the first feedback from the second device.

With reference to the related description in S2501, it can be learned that the second device may send the first feedback to the first device based on the fourth information, for example, send the first feedback and the second feedback in a packaged manner. It should be noted that, if the fourth information indicates that the first device needs to obtain the first feedback, the second device may directly forward the first feedback from the third device to the first device based on the fourth information, without generating the second feedback. In addition, if the second device learns that the third device can directly communicate with the first device, the second device may not send the first feedback.

Figure 26:
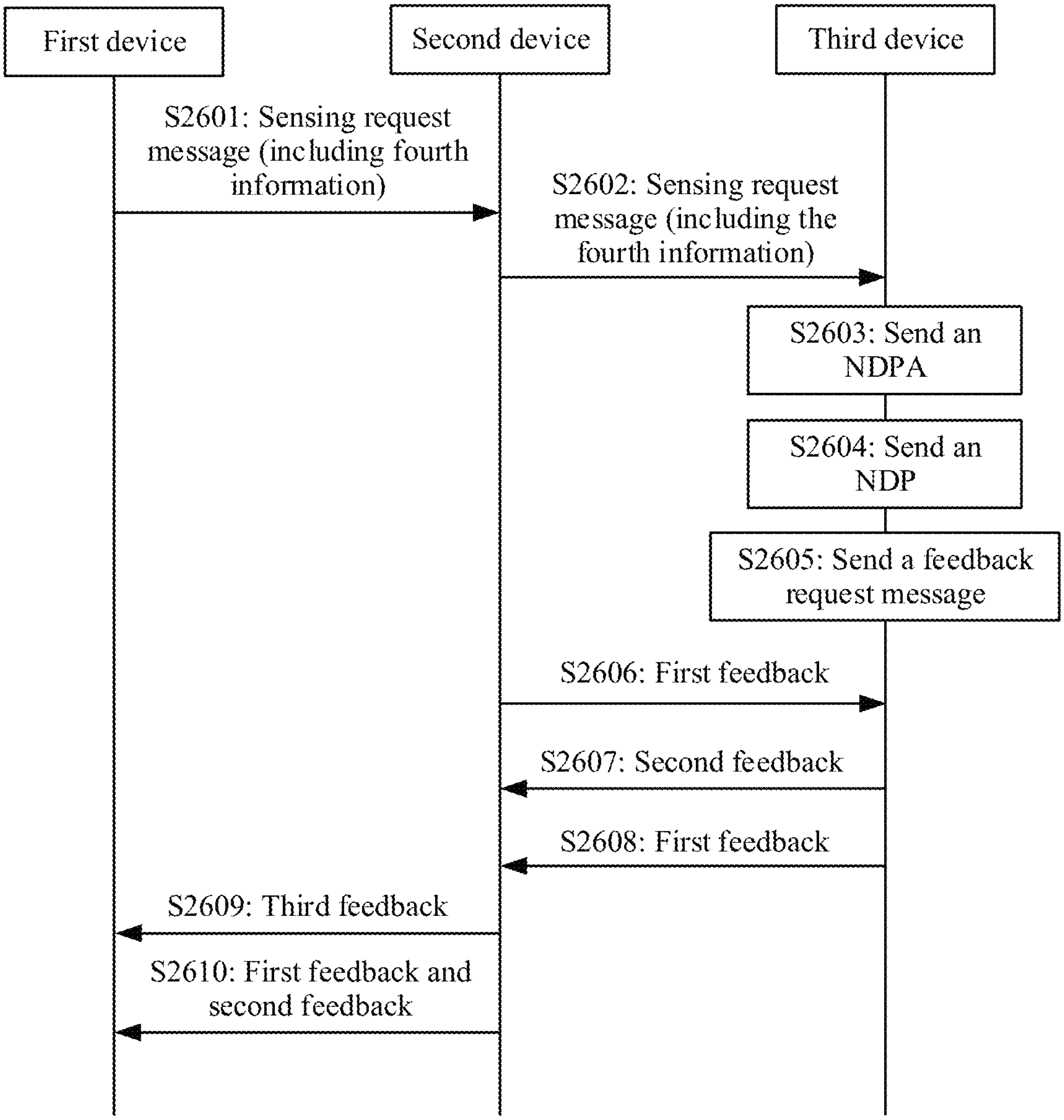
FIG. 26 is a schematic flowchart 6 of a feedback indication method in a scenario C according to an embodiment of this application.

For example, FIG. 26 is a schematic flowchart 6 of the feedback indication method in the scenario C. As shown in FIG. 26, the foregoing determining manner 7, a sensing measurement phase, and a sensing reporting phase are used as an example. The feedback indication method may include the following operations.

S2601: A first device sends a sensing request message to a second device, and the second device receives the sensing request message from the first device.

The sensing request message may further carry the foregoing fourth information. The fourth information may indicate that the first device needs to obtain a first feedback, a second feedback, and a third feedback. In an embodiment, refer to the related descriptions in S2301 and S2302. Details are not described herein again.

S2602: The second device sends the sensing request message to a third device, and the third device receives the sensing request message from the second device.

S2603: The third device sends an NDPA.

S2604: The third device sends an NDP.

S2605: The third device sends a feedback request message.

S2606: The second device sends the first feedback to the third device, and the third device receives the first feedback from the second device.

S2607: The third device sends the second feedback to the second device, and the second device receives the second feedback from the third device.

In an embodiment of S2601 to S2607, refer to the related descriptions in S1901 to S1907. Details are not described herein again.

S2608: The third device sends the first feedback to the second device, and the second device receives the first feedback from the third device.

With reference to the related description in S2601, it can be learned that the third device may send the first feedback to the second device based on the fourth information, for example, send the first feedback and the second feedback in a packaged manner. It should be noted that, if the fourth information indicates that the first device needs only to obtain the first feedback, the third device may directly forward the first feedback from the second device to the second device based on the fourth information, without generating the second feedback.

S2609: The second device sends the third feedback to the first device, and the first device receives the third feedback from the second device.

In an embodiment of S2609, refer to the related description in S1909. Details are not described herein again.

S2610. The second device sends the first feedback and the second feedback to the first device, and the first device receives the first feedback and the second feedback from the second device.

With reference to the related description in S2601, it can be learned that the second device may send the first feedback and the second feedback to the first device based on the fourth information, for example, send the first feedback, the second feedback, and the third feedback in a packaged manner. It should be noted that, if the fourth information indicates that the first device needs only to obtain the first feedback and/or the second feedback, the second device may directly forward the first feedback and/or the second feedback from the second device to the first device based on the fourth information, without generating the second feedback.

It can be learned from the methods shown in FIG. 23 to FIG. 26 that the first device may send the fourth information to the second device based on an actual requirement, for example, a service requirement. In this way, the second device may send an actually required feedback to the first device based on the fourth information, but does not send an actually unrequired feedback, to avoid sending redundant information, so as to reduce communication overheads and improve communication efficiency.

It should be noted that, in embodiments of this application, the foregoing first embodiment and the foregoing second embodiment may be implemented independently, or may be implemented in combination. This is not limited.

Embodiment 3

Figure 27:
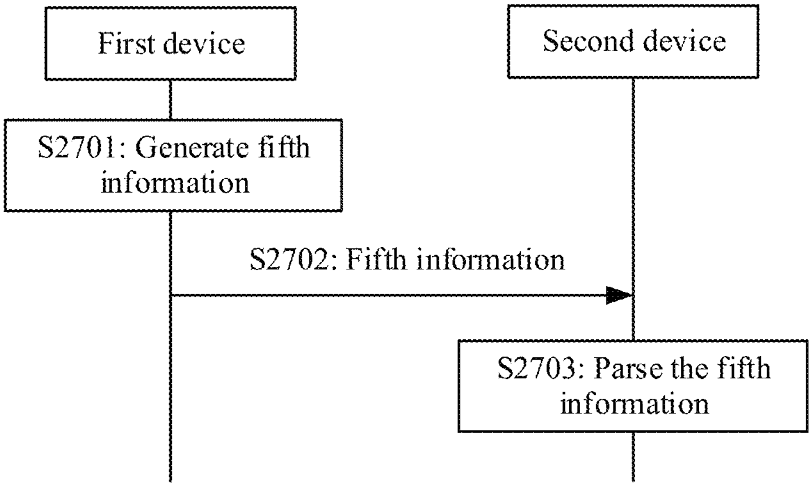
FIG. 27 is a schematic flowchart 3 of a feedback indication method according to an embodiment of this application.

For example, FIG. 27 is a schematic flowchart 3 of the feedback indication method according to an embodiment of this application. The feedback indication method is applicable to communication between two of the three devices shown in FIG. 5, for example, communication between the first device and the second device in the first device, the second device, and the third device. The first device may be a sensing initiator, the second device may be a sensing responder of a sensing transmitter, and the third device may be a sensing responder of a sensing receiver.

As shown in FIG. 27, the feedback indication method may include the following operations.

S2701: The first device generates fifth information.

The fifth information may indicate the second device to determine all configuration parameters of an NDPA, or indicate a part of the configuration parameters of the NDPA, and the other part of the configuration parameters of the NDPA are determined by the second device. For example, all the configuration parameters of the NDPA may include a physical layer protocol data unit (PPDU) type of the NDPA, an LTF size, a target user, a feedback time limit, a configuration parameter for determining a sensing receiver that participates in a sensing process, a configuration parameter for determining a number of the sensing process or a number of a sensing session, or a configuration parameter for determining frequency band information and resource information of the sensing process. The feedback time limit indicates that the first device such as the sensing initiator will trigger feedback within a preset subsequent time period, so that the second device prepares for feedback. In this way, some configuration parameters determined by the second device may include one or more of the following: the configuration parameter for determining the sensing receiver that participates in the sensing process, the configuration parameter for determining the number of the sensing process or the number of the sensing session, the configuration parameter for determining the frequency band information and the resource information of the sensing process, or the like.

Further, the first device may determine the fifth information based on one or more of the following: a status of the first device, a status of the second device, a status of the third device, a service requirement of the first device, a service requirement of the second device, or a service requirement of the third device. This is not limited.

S2702: The first device sends the fifth information, and the second device receives the fifth information.

The fifth information may be carried in one or more of the following: signaling in a sensing setup phase such as a sensing setup request message and a sensing setup reception message or signaling in a sensing measurement phase such as a sensing request message, to reuse signaling, so as to reduce communication overheads and improve communication efficiency.

S2703: The second device parses the fifth information.

The second device may determine all the configuration parameters of the NDPA by parsing the fifth information.

It can be learned from the method shown in FIG. 27 that the configuration parameter of the NDPA may be determined through cooperation between the first device and the second device. In this way, the configuration parameter of the NDPA can be flexibly determined based on a service requirement, so that the configuration parameter of the NDPA can meet the service requirement. For example, if a service of the first device requires the configuration parameter of the NDPA, the first device determines the configuration parameter of the NDPA. However, if a service of the second device requires the configuration parameter of the NDPA, the first device indicates the second device to determine at least a part of the configuration parameters of the NDPA, to meet the service requirement of the second device.

It should be noted that, in embodiments of this application, the foregoing first embodiment, the foregoing second embodiment, and the foregoing third embodiment may be implemented independently, or may be implemented in combination of any two or three embodiments. This is not limited.

The foregoing describes the feedback indication method in embodiments of this application. The following describes a feedback indication apparatus in embodiments of this application. The feedback indication apparatus in embodiments of this application includes a feedback indication apparatus applied to a transmitter and a feedback indication apparatus applied to a receiver, which are separately described below.

In some embodiments, the feedback indication apparatus applied to the transmitter may be applied to the communication system shown in FIG. 5, and has a function of the first device in the feedback indication method shown in FIG. 6. The feedback indication apparatus applied to the receiver may be applied to the communication system shown in FIG. 5, and has any function of the second device in the feedback indication method shown in FIG. 6.

Figure 28:
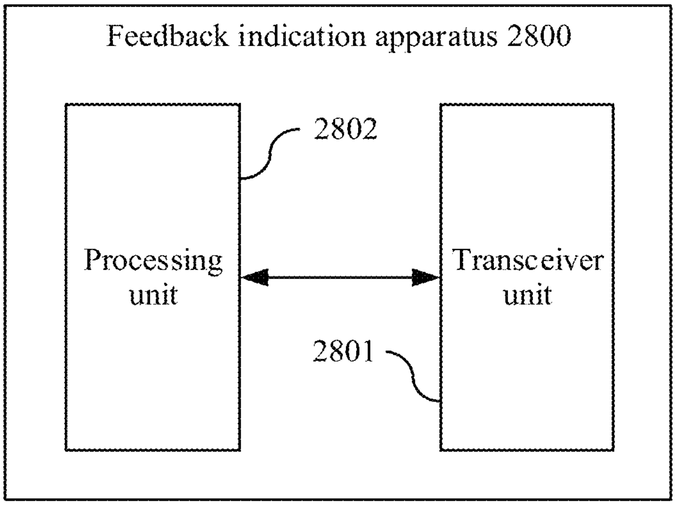
FIG. 28 is a schematic diagram 1 of a structure of a feedback indication apparatus applied to a transmitter according to an embodiment of this application.

For example, FIG. 28 is a schematic diagram of a structure of a feedback indication apparatus 2800 applied to a transmitter. As shown in FIG. 28, the feedback indication apparatus 2800 includes units configured to implement the function of the first device in the feedback indication method shown in FIG. 6, for example, a transceiver unit 2801 and a processing unit 2802.

The processing unit 2802 is configured to generate a first frame. The first frame includes first information, and the first information indicates a feedback type of a first feedback and/or a feedback type of a second feedback. The first feedback and the second feedback are feedbacks at different levels.

The transceiver unit 2801 is configured to send the first frame.

In an embodiment, the first frame may further include mode indication information, and the mode indication information may indicate that the first information indicates any one of the following: the feedback type of the first feedback, the feedback type of the second feedback, or the feedback type of the first feedback and the feedback type of the second feedback.

In an embodiment, the feedback type of the first feedback may include at least one of the following: uncompressed channel state information CSI, compressed CSI, a null data packet NDP, a sensing measurement result, a feedback type determined by a sensing initiator, a feedback type determined by a sensing responder, a feedback type determined by a sensing transmitter, or a feedback type determined by a sensing receiver, where the sensing initiator is the first device.

In an embodiment, the feedback type of the second feedback may include at least one of the following: uncompressed CSI, compressed CSI, an NDP, a sensing measurement result, a feedback type determined by a sensing initiator, a feedback type determined by a sensing responder, a feedback type determined by a sensing transmitter, or a feedback type determined by a sensing receiver, where the sensing initiator is the first device.

In an embodiment, the first information may be carried in at least one of the following: signaling in a sensing setup phase or a sensing request message in a sensing measurement phase.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the first information may include a first field and/or a second field. The first field may indicate the feedback type of the first feedback, and the second field may indicate the feedback type of the second feedback.

In an embodiment, the feedback indication apparatus 2800 may further include a storage unit (not shown in FIG. 28), and the storage unit stores a program or instructions. When the processing unit 2802 executes the program or the instructions, the feedback indication apparatus 2800 can implement the function of the first device in the feedback indication method shown in FIG. 6.

It should be understood that the processing unit 2802 in the feedback indication apparatus 2800 may be implemented by a processor or a circuit component related to a processor. The transceiver unit 2801 may be implemented by a transceiver or a circuit component related to a transceiver.

It should be noted that the feedback indication apparatus 2800 may be a terminal device or a network device, may be a chip (system) or another part or component that may be disposed in a terminal device or a network device, or may be an apparatus including a terminal device or a network device. This is not limited in this application.

In addition, in an embodiment of the feedback indication apparatus 2800, refer to the related description in the feedback indication method shown in FIG. 6. Details are not described herein again.

Figure 29:
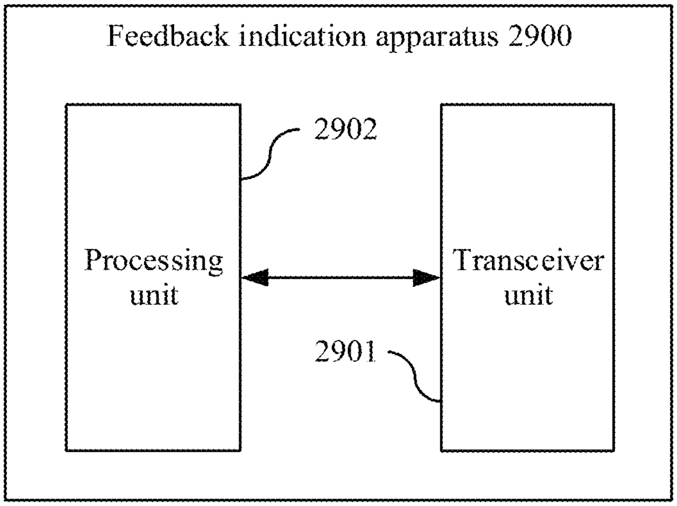
FIG. 29 is a schematic diagram 1 of a structure of a feedback indication apparatus applied to a receiver according to an embodiment of this application.

For example, FIG. 29 is a schematic diagram of a structure of a feedback indication apparatus 2900 applied to a receiver. As shown in FIG. 29, the feedback indication apparatus 2900 includes units configured to implement the function of the second device in the feedback indication method shown in FIG. 6, for example, a transceiver unit 2901 and a processing unit 2902.

The transceiver unit 2901 is configured to receive a first frame. The first frame includes first information, and the first information indicates a feedback type of a first feedback and/or a feedback type of a second feedback. The first feedback and the second feedback are feedbacks at different levels.

The processing unit 2902 is configured to parse the first frame.

In an embodiment, the first frame may further include mode indication information. The mode indication information may indicate that the first information indicates any one of the following: the feedback type of the first feedback, the feedback type of the second feedback, or the feedback type of the first feedback and the feedback type of the second feedback.

In an embodiment, the feedback type of the first feedback may include at least one of the following: uncompressed CSI, compressed CSI, an NDP, a sensing measurement result, a feedback type determined by a sensing initiator, a feedback type determined by a sensing responder, a feedback type determined by a sensing transmitter, or a feedback type determined by a sensing receiver, where the sensing initiator may be the first device.

In an embodiment, the feedback type of the second feedback may include at least one of the following: uncompressed CSI, compressed CSI, an NDP, a sensing measurement result, a feedback type determined by a sensing initiator, a feedback type determined by a sensing responder, a feedback type determined by a sensing transmitter, or a feedback type determined by a sensing receiver, where the sensing initiator may be the first device.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the first information does not indicate the feedback type of the first feedback or indicates that the feedback type of the first feedback may include a feedback type determined by a sensing transmitter, where the sensing transmitter may be the second device. In this way, after parsing the first frame, the processing unit 2902 is further configured to control the transceiver unit 2901 to send second information to a third device. The second information indicates that the feedback type of the first feedback includes at least one of the following: uncompressed CSI, compressed CSI, an NDP, a sensing measurement result, or a feedback type determined by a sensing receiver, where the sensing receiver may be the third device.

In an embodiment, the second information may be carried in signaling in sensing measurement phase.

In an embodiment, the first information may include a first field and a second field. The first field may indicate the feedback type of the first feedback, and the second field may indicate the feedback type of the second feedback.

In an embodiment, the first field may indicate that the feedback type of the first feedback includes at least one of the following: uncompressed CSI, compressed CSI, an NDP, a sensing measurement result, or a feedback type determined by a sensing receiver, where the sensing receiver may be a third device. After parsing the first frame, the processing unit 2902 is further configured to control the transceiver unit 2901 to send only the first field to the third device.

In an embodiment, the second field may indicate that the feedback type of the second feedback includes a feedback type determined by a sensing receiver, where the sensing receiver may be a third device. After parsing the first frame, the processing unit 2902 is further configured to control the transceiver unit 2901 to send only the second field to the third device.

Further, after sending only the second field to the third device, the transceiver unit 2901 is further configured to receive third information from the third device. The third information may indicate that the feedback type of the second feedback includes at least one of the following: uncompressed CSI, compressed CSI, an NDP, or a sensing measurement result.

In an embodiment, the first information may be carried in at least one of the following: signaling in a sensing setup phase or the signaling in the sensing measurement phase, to reuse signaling, so as to reduce communication overheads and improve communication efficiency.

In an embodiment, the feedback indication apparatus 2900 may further include a storage unit (not shown in FIG. 29), and the storage unit stores a program or instructions. When the processing unit 2902 executes the program or the instructions, the feedback indication apparatus 2900 can implement the function of the second device in the feedback indication method shown in FIG. 6.

It should be understood that the processing unit 2902 in the feedback indication apparatus 2900 may be implemented by a processor or a circuit component related to a processor. The transceiver unit 2901 may be implemented by a transceiver or a circuit component related to a transceiver.

It should be noted that the feedback indication apparatus 2900 may be a terminal device or a network device, may be a chip (system) or another part or component that may be disposed in a terminal device or a network device, or may be an apparatus including a terminal device or a network device. This is not limited in this application.

In addition, in an embodiment of the feedback indication apparatus 2900, refer to the related description in the feedback indication method shown in FIG. 6. Details are not described herein again.

In some other embodiments, the feedback indication apparatus applied to the transmitter may be applied to the communication system shown in FIG. 5, and has a function of the first device in the feedback indication method shown in FIG. 23. The feedback indication apparatus applied to the receiver may be applied to the communication system shown in FIG. 5, and has any function of the second device in the feedback indication method shown in FIG. 23.

Figure 30:
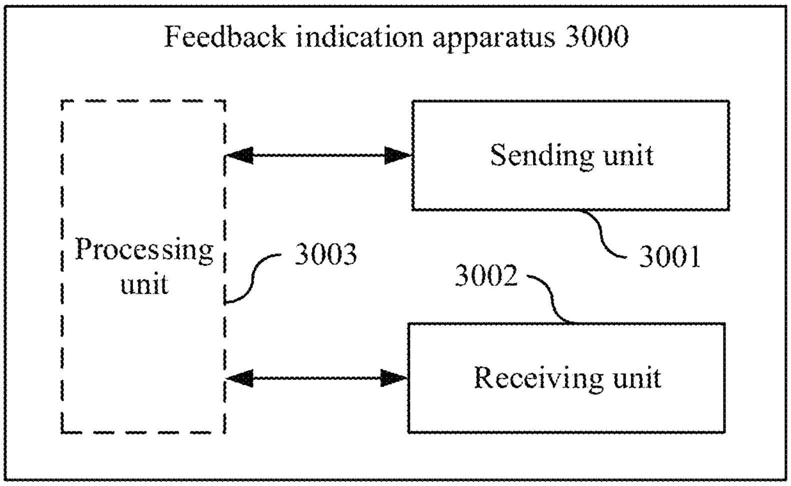
FIG. 30 is a schematic diagram 2 of a structure of a feedback indication apparatus applied to a transmitter according to an embodiment of this application.

For example, FIG. 30 is a schematic diagram of a structure of a feedback indication apparatus 3000 applied to a transmitter. As shown in FIG. 30, the feedback indication apparatus 3000 includes units configured to implement the function of the first device in the feedback indication method shown in FIG. 23, for example, a sending unit 3001 and a receiving unit 3002.

The sending unit 3001 is configured to send fourth information. The fourth information indicates that the first device needs to obtain a first feedback and/or a second feedback, and the first feedback and the second feedback are feedbacks at different levels.

The receiving unit 3002 is configured to receive the first feedback and/or the second feedback.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the fourth information may be carried in at least one of the following: signaling in a sensing setup phase or a sensing request message in a sensing measurement phase, to reuse signaling, so as to reduce communication overheads and improve communication efficiency.

In an embodiment, the sending unit 3001 and the receiving unit 3002 may alternatively be integrated into one unit, for example, a transceiver unit (not shown in FIG. 30). The transceiver unit is configured to implement a sending function and a receiving function of the feedback indication apparatus 3000.

In an embodiment, the feedback indication apparatus 3000 may further include a processing unit 3003 (shown in a dashed-line box in FIG. 30). The processing unit 3003 is configured to implement a processing function of the feedback indication apparatus 3000.

In an embodiment, the feedback indication apparatus 3000 may further include a storage unit (not shown in FIG. 30), and the storage unit stores a program or instructions. When the processing unit 3003 executes the program or the instructions, the feedback indication apparatus 3000 can implement the function of the first device in the feedback indication method shown in FIG. 23.

It should be understood that the processing unit 3001 in the feedback indication apparatus 3000 may be implemented by a processor or a circuit component related to a processor, and may be a processor or a processing unit. The transceiver unit may be implemented by a transceiver or a circuit component related to a transceiver.

It should be noted that the feedback indication apparatus 3000 may be a terminal device or a network device, or may be a chip (system) or another part or component disposed in the terminal device or the network device, or an apparatus including the terminal device or the network device. This is not limited in embodiments of this application.

In addition, in an embodiment of the feedback indication apparatus 3000, refer to the related description in the feedback indication method shown in FIG. 23. Details are not described herein again.

Figure 31:
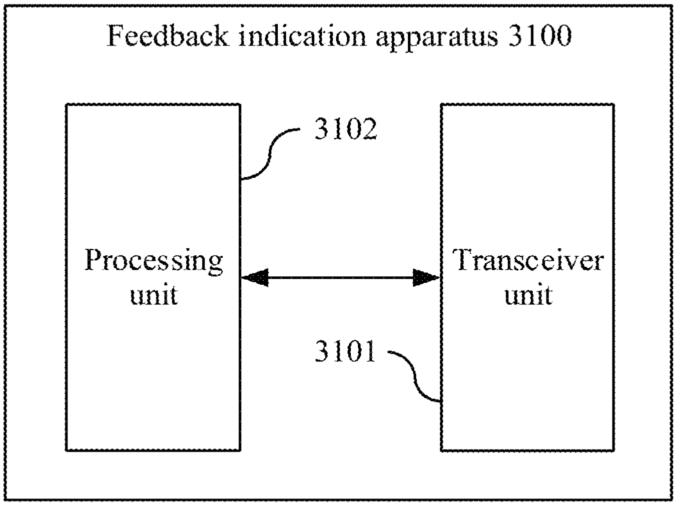
FIG. 31 is a schematic diagram 2 of a structure of a feedback indication apparatus applied to a receiver according to an embodiment of this application.

For example, FIG. 31 is a schematic diagram of a structure of a feedback indication apparatus 3100 applied to a receiver. As shown in FIG. 31, the feedback indication apparatus 3100 includes units configured to implement the function of the second device in the feedback indication method shown in FIG. 23, for example, a transceiver unit 3101 and a processing unit 3102.

The transceiver unit 3101 is configured to receive fourth information. The fourth information indicates that the first device needs to obtain a first feedback and/or a second feedback, and the first feedback and the second feedback are feedbacks at different levels.

The processing unit 3102 is configured to control, based on the fourth information, the transceiver unit 3102 to send the first feedback and/or the second feedback.

In an embodiment, that the first feedback and the second feedback are feedbacks at different levels may mean that a sending occasion of the first feedback is different from a sending occasion of the second feedback, or a sending object of the first feedback is different from a sending object of the second feedback.

In an embodiment, the fourth information may be carried in at least one of the following: signaling in a sensing setup phase or a sensing request message in a sensing measurement phase.

In an embodiment, the feedback indication apparatus 3100 may further include a storage unit (not shown in FIG. 31), and the storage unit stores a program or instructions. When the processing unit 3102 executes the program or the instructions, the feedback indication apparatus 3100 can implement the function of the second device in the feedback indication method shown in FIG. 23.

It should be understood that the processing unit 3102 in the feedback indication apparatus 3100 may be implemented by a processor or a circuit component related to a processor, and may be a processor. The transceiver unit 3101 may be implemented by a transceiver or a circuit component related to a transceiver.

It should be noted that the feedback indication apparatus 3100 may be a terminal device or a network device, may be a chip (system) or another part or component that may be disposed in a terminal device or a network device, or may be an apparatus including a terminal device or a network device. This is not limited in this application.

In addition, in an embodiment of the feedback indication apparatus 3100, refer to the related description in the feedback indication method shown in FIG. 23. Details are not described herein again.

In still some other embodiments, the feedback indication apparatus applied to the transmitter may be applied to the communication system shown in FIG. 5, and has a function of the first device in the feedback indication method shown in FIG. 27. The feedback indication apparatus applied to the receiver may be applied to the communication system shown in FIG. 5, and has any function of the second device in the feedback indication method shown in FIG. 27.

Figure 32:
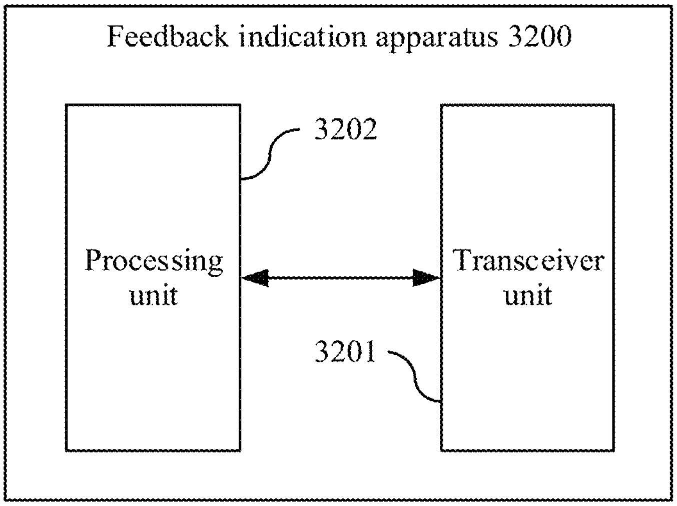
FIG. 32 is a schematic diagram 3 of a structure of a feedback indication apparatus applied to a transmitter according to an embodiment of this application.

For example, FIG. 32 is a schematic diagram of a structure of a feedback indication apparatus 3200 applied to a transmitter. As shown in FIG. 32, the feedback indication apparatus 3200 includes units configured to implement the function of the first device in the feedback indication method shown in FIG. 27, for example, a transceiver unit 3201 and a processing unit 3202.

The processing unit 3202 is configured to generate fifth information. The fifth information indicates the second device to determine all configuration parameters of an NDPA, or the fifth information indicates a part of the configuration parameters of the NDPA, and the other part of the configuration parameters of the NDPA are determined by the second device.

The transceiver unit 3201 is configured to send the fifth information.

In an embodiment, the fifth information may be carried in one or more of the following: signaling in a sensing setup phase or a sensing request message in a sensing measurement phase, to reuse signaling, so as to reduce communication overheads and improve communication efficiency.

In an embodiment, the feedback indication apparatus 3200 may further include a storage unit (not shown in FIG. 32), and the storage unit stores a program or instructions. When the processing unit 3202 executes the program or the instructions, the feedback indication apparatus 3200 can implement the function of the first device in the feedback indication method shown in FIG. 27.

It should be understood that the processing unit 3202 in the feedback indication apparatus 3200 may be implemented by a processor or a circuit component related to a processor. The transceiver unit 3201 may be implemented by a transceiver or a circuit component related to a transceiver.

It should be noted that the feedback indication apparatus 3200 may be a terminal device or a network device, may be a chip (system) or another part or component that may be disposed in a terminal device or a network device, or may be an apparatus including a terminal device or a network device. This is not limited in this application.

In addition, in an embodiment of the feedback indication apparatus 3200, refer to the related description in the feedback indication method shown in FIG. 27. Details are not described herein again.

Figure 33:
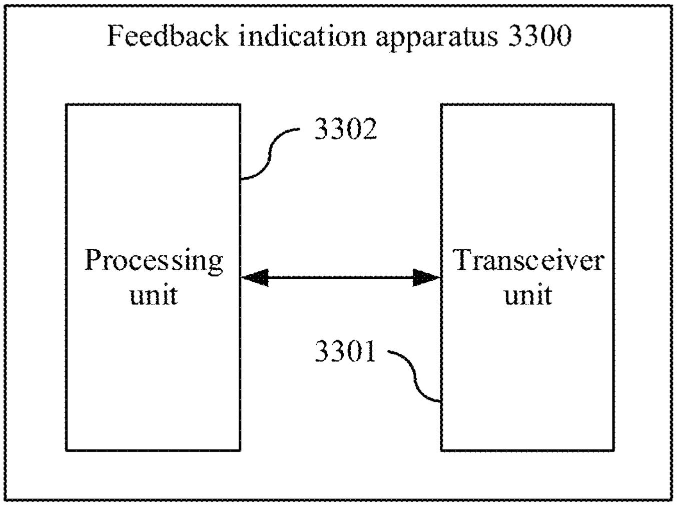
FIG. 33 is a schematic diagram 3 of a structure of a feedback indication apparatus applied to a receiver according to an embodiment of this application.

For example, FIG. 33 is a schematic diagram of a structure of a feedback indication apparatus 3300 applied to a receiver. As shown in FIG. 33, the feedback indication apparatus 3300 includes units configured to implement the function of the second device in the feedback indication method shown in FIG. 27, for example, a transceiver unit 3301 and a processing unit 3302.

The transceiver unit 3301 is configured to receive fifth information. The fifth information indicates the second device to determine all configuration parameters of an NDPA, or the fifth information indicates a part of the configuration parameters of the NDPA, and the other part of the configuration parameters of the NDPA are determined by the second device.

The processing unit 3302 is configured to parse the fifth information.

In an embodiment, the fifth information may be carried in one or more of the following: signaling in a sensing setup phase or a sensing request message in a sensing measurement phase.

In an embodiment, the feedback indication apparatus 3300 may further include a storage unit (not shown in FIG. 33), and the storage unit stores a program or instructions. When the processing unit 3302 executes the program or the instructions, the feedback indication apparatus 3300 can implement the function of the second device in the feedback indication method shown in FIG. 27.

It should be understood that the processing unit 3302 in the feedback indication apparatus 3300 may be implemented by a processor or a circuit component related to a processor. The transceiver unit 3301 may be implemented by a transceiver or a circuit component related to a transceiver.

It should be noted that the feedback indication apparatus 3300 may be a terminal device or a network device, may be a chip (system) or another part or component that may be disposed in a terminal device or a network device, or may be an apparatus including a terminal device or a network device. This is not limited in this application.

In addition, in an embodiment of the feedback indication apparatus 3300, refer to the related description in the feedback indication method shown in FIG. 27. Details are not described herein again.

The foregoing describes the feedback indication apparatus applied to the transmitter and the feedback indication apparatus applied to the receiver in embodiments of this application. The following describes a possible product form of the feedback indication apparatus applied to the transmitter and the feedback indication apparatus applied to the receiver. It should be understood that any product in any form that has the feature of the feedback indication apparatus applied to the transmitter shown in FIG. 28, FIG. 30, or FIG. 32, and any product in any form that has the feature of the feedback indication apparatus applied to the receiver in FIG. 29, FIG. 31, or FIG. 33 shall fall within the protection scope of this application. It should be further understood that the following description is merely an example, and a product form of the feedback indication apparatus applied to the transmitter and a product form of the feedback indication apparatus applied to the receiver in embodiments of this application are limited thereto.

In a possible product form, the feedback indication apparatus applied to the transmitter and the feedback indication apparatus applied to the receiver in embodiments of this application may be implemented by a general bus architecture.

The feedback indication apparatus applied to the transmitter includes a processor and a transceiver that communicates with the processor internally. The processor is configured to perform a processing function of the first device in the feedback indication method shown in FIG. 6, FIG. 23, or FIG. 27. The transceiver is configured to perform a sending and receiving function of the first device in the feedback indication method shown in FIG. 6, FIG. 23, or FIG. 27. In an embodiment, the feedback indication apparatus applied to the transmitter may further include a memory. The memory is configured to store instructions executed by the processor.

The feedback indication apparatus applied to the receiver includes a processor and a transceiver that communicates with the processor internally. The processor is configured to perform a processing function of the second device in the feedback indication method shown in FIG. 6, FIG. 23, or FIG. 27. The transceiver is configured to perform a sending and receiving function of the second device in the feedback indication method shown in FIG. 6, FIG. 23, or FIG. 27. In an embodiment, the feedback indication apparatus applied to the receiver may further include a memory. The memory is configured to store instructions executed by the processor.

In a possible product form, the feedback indication apparatus applied to the transmitter and the feedback indication apparatus applied to the receiver in embodiments of this application may be implemented by a general-purpose processor.

The general-purpose processor for implementing the feedback indication apparatus applied to the transmitter includes a processing circuit, and an output interface that communicates with the processing circuit internally. The processing circuit is configured to control the output interface to perform a sending and receiving function. In an embodiment, the general-purpose processor may further include a storage medium, and the storage medium is configured to store instructions executed by the processing circuit.

The general-purpose processor for implementing the feedback indication apparatus applied to the receiver includes a processing circuit, and an input interface that communicates with the processing circuit internally. The processing circuit is configured to control the output interface to perform a sending and receiving function. In an embodiment, the general-purpose processor may further include a storage medium, and the storage medium is configured to store instructions executed by the processing circuit.

In a possible product form, the feedback indication apparatus applied to the transmitter and the feedback indication apparatus applied to the receiver in embodiments of this application may be further implemented by the following: one or more FPGAs (field-programmable gate arrays), PLDs (programmable logic devices), controllers, state machines, gate logic, discrete hardware parts, any other suitable circuits, or any combination of circuits that can implement various functions described throughout this application.

It should be understood that the feedback indication apparatuses applied to the transmitter and the feedback indication apparatuses applied to the receiver in the foregoing product forms respectively have any function of the transmitter and the receiver in the foregoing method embodiments. Details are not described herein again.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

One of ordinary skilled in the art may be aware that, the method operations and units that are described with reference to embodiments disclosed in this specification can be implemented by electronic hardware, computer software, or a combination thereof. To clearly describe the interchangeability between the hardware and the software, the foregoing has generally described operations and compositions of each embodiment based on functions. Whether the functions are implemented by hardware or software depends on particular applications and design constraint conditions of the technical solutions. One of ordinary skilled in the art may use different methods to implement the described functions for each particular application, but it should not be considered that the implementation goes beyond the scope of this application.

It may be clearly understood by one of ordinary skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When being implemented in the form of the software functional unit and sold or used as an independent product, the integrated unit may be stored in a computer-readable storage medium. Based on such an understanding, the technical solutions of this application essentially, or a part contributing to the conventional technology, or all or some of the technical solutions may be implemented in a form of a software product. The computer software product is stored in a storage medium, and includes a plurality of instructions for instructing a computer device (which may be a personal computer, a server, or a network device) to perform all or some of the operations of the methods described in embodiments of this application. The foregoing storage medium includes any medium that can store program code, for example, a USB flash drive, a removable hard disk, a read-only memory (ROM), a random access memory (RAM), a magnetic disk, or a compact disc.

The foregoing descriptions are merely implementations of this application, but are not intended to limit the protection scope of this application. Any equivalent modification or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A feedback indication method, comprising:

sending, by a first device, a sensing request message to a second device connected to a third device, the sensing request message instructing the second device to send a null data packet announcement (NDPA), a null data packet (NDP) and a feedback request message to the third device after the second device receives the sensing request message, wherein the sensing request message comprises one or more first configuration parameters of the NDPA as well as information instructing the second device to determine one or more second configuration parameters of the NDPA, and the one or more first configuration parameters of the NDPA include a feedback time limit indicating that the first device will trigger a next feedback within a preset subsequent time period;

receiving, by the first device, a second feedback of a sensing measurement result sent by the second device, wherein the second feedback is sent by the second device after a first feedback of the sensing measurement result is sent by the third device to the second device, and the first feedback of the sensing measurement result is sent from the third device to the second device after the third device receives the feedback request message.

2. The method according to claim 1, wherein the sensing request message comprises information indicating that the first device needs to obtain the first feedback and/or the second feedback of the sensing measurement result.

3. The method according to claim 2, wherein the information is carried in at least one of: signaling in a sensing setup phase or the sensing request message in a sensing measurement phase.

4. The method according to claim 1, wherein the configuration parameters of the NDPA include a physical layer protocol data unit (PPDU) type of the NDPA.

5. The method according to claim 4, wherein the NDPA information is carried in one or more of: signaling in a sensing setup phase or a sensing request message in a sensing measurement phase.

6. A feedback indication method, comprising:

receiving, by a second device, a sensing request message sent by a first device, wherein the second device is connected to a third device, and wherein the sensing request message instructs the second device to send a null data packet announcement (NDPA), a null data packet (NDP) and a feedback request message to the third device;

sending, by the second device, the null data packet announcement (NDPA), the null data packet (NDP) and the feedback request message to the third device after the second device receives the sensing request message, wherein the sensing request message comprises one or more first configuration parameters of the NDPA as well as information instructing the second device to determine one or more second configuration parameters of the NDPA, and the one or more first configuration parameters of the NDPA include a feedback time limit indicating that the first device will trigger a next feedback within a preset subsequent time period;

receiving, by the second device, a first feedback of a sensing measurement result from the third device;

sending, by the second device, a second feedback of the sensing measurement result to the first device, wherein the second feedback is sent by the second device after the first feedback is sent by the third device to the second device, and the first feedback of the sensing measurement result is sent from the third device to the second device after the third device receives the feedback request message.

7. The method according to claim 6, wherein the sensing request message comprises information indicating that the first device needs to obtain the first feedback and/or the second feedback of the sensing measurement result.

8. The method according to claim 7, wherein the information is carried in at least one of: signaling in a sensing setup phase or a sensing request message in a sensing measurement phase.

9. The method according to claim 6, wherein the configuration parameters of the NDPA includes a physical layer protocol data unit (PPDU) type of the NDPA.

10. The method according to claim 9, wherein the information is carried in one or more of: signaling in a sensing setup phase or a sensing request message in a sensing measurement phase.

11. A feedback indication apparatus, comprising:

a processor, and a memory coupled to the processor to store instructions, which when executed by the processor, cause the feedback indication apparatus to perform operations, the operations comprising:

sending a sensing request message to a second device connected to a third device, the sensing request message instructing the second device to send a null data packet announcement (NDPA), a null data packet (NDP) and a feedback request message to the third device after the second device receives the sensing request message, wherein the sensing request message comprises one or more first configuration parameters of the NDPA as well as information instructing the second device to determine one or more second configuration parameters of the NDPA, and the one or more first configuration parameters of the NDPA include a feedback time limit indicating that the feedback indication apparatus will trigger a next feedback within a preset subsequent time period;

receiving a second feedback of a sensing measurement result sent by the second device, wherein the second feedback is sent by the second device after a first feedback of the sensing measurement result is sent by the third device to the second device, and the first feedback of the sensing measurement result is sent from the third device to the second device after the third device receives the feedback request message.

12. The apparatus according to claim 11, wherein the sensing request message comprises information indicating that the apparatus needs to obtain the first feedback and/or the second feedback of the sensing measurement result.

13. The apparatus according to claim 12, wherein the information is carried in at least one of: signaling in a sensing setup phase or a sensing request message in a sensing measurement phase.

14. The apparatus according to claim 11, wherein the configuration parameters of the NDPA includes a physical layer protocol data unit (PPDU) type of the NDPA.

15. The apparatus according to claim 14, wherein the NDPA information is carried in one or more of: signaling in a sensing setup phase or a sensing request message in a sensing measurement phase.

16. The method according to claim 1, wherein the first feedback and the second feedback are at different levels.

17. The method according to claim 1, wherein a sending occasion of the first feedback is different from a sending occasion of the second feedback.

18. The method according to claim 1, wherein a sending object of the first feedback is different from a sending object of the second feedback.

19. The method according to claim 1, wherein a first feedback type of the first feedback includes one or more of: uncompressed channel state information (CSI), compressed CSI, the NDP, the sensing measurement result, a feedback type determined by a sensing initiator, a feedback type determined by a sensing responder, a feedback type determined by a sensing transmitter, or a feedback type determined by a sensing receiver, wherein the sensing initiator is the first device.

20. The method according to claim 1, wherein a second feedback type of the second feedback includes one or more of: uncompressed channel state information (CSI), compressed CSI, the NDP, the sensing measurement result, a feedback type determined by a sensing initiator, a feedback type determined by a sensing responder, a feedback type determined by a sensing transmitter, or a feedback type determined by a sensing receiver, wherein the sensing initiator is the first device.

* * * * *